(12) United States Patent
Doi et al.

(10) Patent No.: US 8,268,661 B2
(45) Date of Patent: Sep. 18, 2012

(54) SEALING LAMINATED SHEET FOR ELECTRONIC DEVICE AND ELECTRONIC DEVICE PRODUCTION METHOD USING SAME

(75) Inventors: Katsuhiro Doi, Chiba (JP); Kenichi Okada, Chiba (JP); Hiroki Usui, Chiba (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 13/112,530

(22) Filed: May 20, 2011

(65) Prior Publication Data
US 2011/0223703 A1 Sep. 15, 2011

Related U.S. Application Data

(63) Continuation of application No. PCT/JP2010/051555, filed on Feb. 4, 2010.

(30) Foreign Application Priority Data

Jul. 28, 2009 (JP) .................................. 2009-175939

(51) Int. Cl.
*H01L 21/00* (2006.01)
(52) U.S. Cl. .................. 438/64; 257/E21.499; 428/212

(58) Field of Classification Search ................. 438/64; 257/E21.499; 428/212
See application file for complete search history.

(56) References Cited

U.S. PATENT DOCUMENTS

| 2008/0053512 A1 * | 3/2008 | Kawashima | 136/244 |
| 2011/0272026 A1 * | 11/2011 | Nishijima | 136/259 |

FOREIGN PATENT DOCUMENTS

| JP | 2001-075064 A | 3/2001 |
| JP | 2005-213470 A | 8/2005 |
| JP | 2005-228493 A | 8/2005 |
| JP | 2007-073273 A | 3/2007 |
| JP | 2007-294696 A | 11/2007 |
| JP | 2008-226782 A | 9/2008 |

* cited by examiner

*Primary Examiner* — Alexander Ghyka
*Assistant Examiner* — Stanetta Isaac
(74) *Attorney, Agent, or Firm* — Sughrue Mion, PLLC

(57) ABSTRACT

The present invention is a sealing laminated sheet for an electronic device in which a first sheet and a second sheet 5 are laminated, wherein the first sheet contains an acid-modified polyolefin-based thermoplastic resin, the second sheet 5 has a melting point higher than that of the first sheet, and a peel strength at 25° C. of the second sheet 5 relative to the first sheet is 0.5 to 10.0 N/15 mm. According to the present invention, the production yield of an electronic device can be improved.

13 Claims, 17 Drawing Sheets

F I G. 2
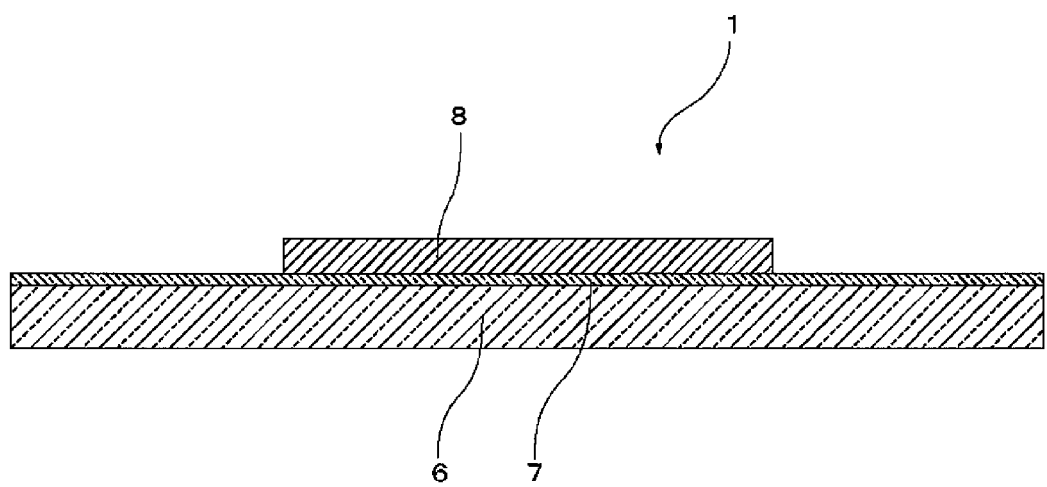

F I G. 8
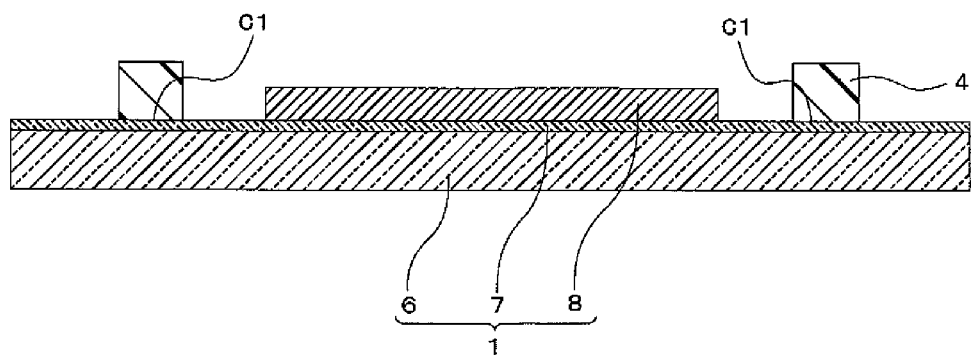

F I G. 1 1
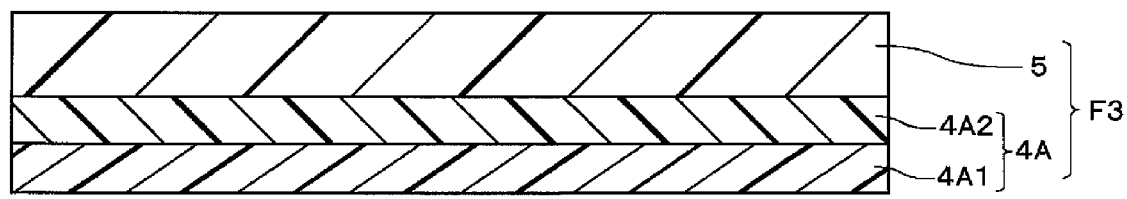

SEALING LAMINATED SHEET FOR ELECTRONIC DEVICE AND ELECTRONIC DEVICE PRODUCTION METHOD USING SAME

CROSS REFERENCE TO RELATED APPLICATIONS

This application is a Continuation of National Stage of International Application No. PCT/JP2010/051555 filed Feb. 4, 2010, claiming priority based on Japanese Patent Application No. 2009-175939 filed Jul. 28, 2009, the contents of all of which are incorporated herein by reference in their entirety.

TECHNICAL FIELD

The present invention relates to a sealing laminated sheet for electronic devices and an electronic device production method using the laminated sheet.

BACKGROUND ART

Some known examples of electronic devices include photoelectric conversion elements such as dye-sensitized solar cells or organic thin film solar cells, and display elements such as liquid crystal display apparatuses or EL display apparatuses. Among these, dye-sensitized solar cells are attracting attention as photoelectric conversion elements due to being inexpensive and allowing the obtaining of high photoelectric conversion efficiency, and a diverse range of development is being carried out related to dye-sensitized solar cells.

Dye-sensitized solar cells are typically provided with a working electrode, counter electrode, photosensitive dye loaded onto the working electrode, sealing portion that connects the working electrode and the counter electrode, and electrolyte layer arranged in a space (cell space) surrounded by the working electrode, counter electrode and sealing portion.

In such a dye-sensitized solar cell, although the sealing portion can be fixed on an electrode (such as the working electrode) surface by dissolving a sealing material in a solvent, coating it onto the working electrode and drying it, more recently, the sealing portion is typically fixed on an electrode surface by forming the sealing material into the shape of a quadrangular ring and arranging this on the electrode surface followed by heating and melting through the sheet in order to efficiently fix the sealing portion to the electrode surface (Patent Document 1).

Patent Document 1: Japanese Patent Application Laid-open No. 2005-213470

SUMMARY OF THE INVENTION

Problems to be Solved by the Invention

However, the method described in Patent Document 1 had the problems indicated below.

Namely, the sealing material is thin and is in the shape of a quadrangular ring. Consequently, the sealing material has difficulty in retaining its own shape and deforms easily. Consequently, when the sealing material is arranged on an electrode surface, the sealing material may be arranged on the electrode surface in a twisted state or may be arranged at location shifted from a desired location on the electrode surface. Consequently, the work of arranging the sealing material on the electrode surface must be carried out carefully to prevent the occurrence of twisting or improper positioning of the sealing material, thereby leaving room for improvement with respect to work efficiency.

In addition, if the sealing material is adhered to the electrode surface by heating and melting the sealing material in a twisted state, the width of the sealing portion of the resulting quadrangular ring is no longer uniform along the circumferential direction thereof, thereby resulting in inadequate sealing performance of the sealing portion and causing photoelectric conversion efficiency to rapidly decrease after production. Consequently, production yield cannot be said to be adequate. In addition, in the case the sealing material is arranged on the electrode surface in a state in which it has shifted from a desired location thereon, the performance of the sealing portion again becomes inadequate, and production yield again cannot be said to be adequate.

The problems described above occur in not only dye-sensitized solar cells, but in other photoelectric conversion elements such as organic thin film solar cells and in display elements such as liquid crystal display apparatuses, EL display apparatuses and the like.

With the foregoing in view, an object of the present invention is to provide a sealing laminated sheet for an electronic device that is capable of improving production efficiency and production yield of electronic devices, and an electronic device production method using that laminated sheet.

Means for Solving the Problems

As a result of conducting extensive studies to solve the above problems, the inventors of the present invention considered laminating a film on an annular sealing material. This is because they thought that by laminating an annular sealing material on a film, for example, the shape of the annular sealing material would be retained when arranging the annular sealing material on an electrode surface, thereby making it possible to solve the above problems. However, according to experiments conducted by the inventors of the present invention, it was noticed that simply laminating an annular sealing material and film alone was not able to adequately improve sealing performance of the sealing portion, and production yield of electronic devices was unable to be adequately improved. Therefore, as a result of conducting additional extensive studies to determine the cause of this problem, the inventors of the present invention found that, when fixing the sealing portion to an electrode surface, by laminating a first sheet containing a prescribed thermoplastic resin and a second sheet having a melting point higher than the first sheet, and using a laminated sheet in which the peel strength at 25° C. of the second sheet relative to the first sheet is within a prescribed range, the above problems can be solved, thereby leading to completion of the present invention.

Namely, the present invention is a sealing laminated sheet for an electronic device, in which a first sheet and a second sheet are laminated, wherein the first sheet contains an acid-modified polyolefin-based thermoplastic resin, the second sheet has a melting point higher than that of the first sheet, and a peel strength at 25° C. of the second sheet relative to the first sheet is 0.5 to 10.0 N/15 mm.

The following effects are obtained with this sealing laminated sheet. Namely, in the case of forming a sealing portion on an electrode of an electronic device using the sealing laminated sheet of the present invention, the first sheet of the sealing laminated sheet is first formed into an annular sealing portion using a metal mold, for example. In this case, the first sheet is completely cut in the direction of thickness by allowing the blade of the metal mold to pass through the first sheet and reach a portion of the second sheet. Subsequently, the inserted metal mold can be extracted from the first sheet and a portion of the second sheet. At this time, in the sealing laminated sheet of the present invention, as a result of the peel strength at 25° C. of the second sheet relative to the first sheet being 0.5 N/15 mm or more, the metal mold can be easily extracted without causing separation of the first sheet from the second sheet. Consequently, the blade of the metal mold is easily extracted from the first sheet, thereby making processing work of the first sheet extremely easy. Moreover, when separating unnecessary portions of the first sheet from the second sheet as well, not only are the unnecessary portions separated easily, but the necessary portion of the first sheet that serves as the sealing portion is suitably adhered to the second sheet, thereby facilitating processing work.

After having obtained an annular sealing portion in the manner described above, a laminate in which the sealing portion is laminated on the second sheet is arranged on an electrode surface. At this time, although strength is inadequate and it is difficult to stably retain its own shape in the case of using only the annular sealing portion, the sealing portion is reinforced as a result of laminating to the second sheet. Consequently, the sealing portion can be arranged on the electrode surface while stably retaining the shape of the sealing portion. Thus, in comparison with the sealing portion being arranged on the electrode surface in a state in which it does not stably retain its shape, such as in a twisted state, and is adhered after being heated and melted while in that state, the annular sealing portion can be arranged on the electrode surface in a state in which width along the circumferential direction thereof is nearly constant.

In the case of heating and melting the annular sealing portion through the second sheet, since the second sheet has a melting point that is higher than that of the first sheet, the second sheet is more resistant to melting than the sealing portion. Consequently, changes in peel strength of the second sheet relative to the first sheet can be adequately inhibited.

Moreover, when separating the second sheet from the sealing portion after having melted the annular heating portion by heating, the second sheet can be easily separated from the sealing portion. More specifically, since the acid-modified polyolefin-based thermoplastic resin contained in the sealing portion has polar groups such as carboxyl groups or maleic anhydride groups in a molecule thereof, it easily adheres to metal oxides or glass having hydroxyl groups by hydrogen bonding. In addition, in the case the acid-modified polyolefin-based thermoplastic resin is adhered to a metal oxide, since ionic bonding occurs between polar groups and metal atoms contained in the metal oxide, the acid-modified polyolefin-based thermoplastic resin tends to adhere particularly well to metal oxides. Electrodes in which a film composed of a metal catalyst is formed on a base material composed of metal or glass, or electrodes in which a transparent conductive film is formed on a base material composed of glass are typically used for the electrodes used in electronic devices such as dye-sensitized solar cells, organic thin film solar cells, liquid crystal display apparatuses or EL display apparatuses. Here, the surface of the base material composed of metal or the film composed of a metal catalyst is oxidized resulting in the formation of metal oxide. Namely, the surface of the base material is composed of metal oxide or glass, and the surface of the film is also composed of metal oxide. Consequently, the acid-modified polyolefin-based thermoplastic resin easily adheres to the surface of the base material as well as the surface of the film thereon. Namely, the acid-modified polyolefin-based thermoplastic resin easily adheres to the electrode surface. Consequently, the sealing portion can be strongly adhered to the electrode surface by heating and melting. Thus, when separating the second sheet from the sealing portion, separation of the sealing portion from the electrode surface is adequately prevented. In this case, if the peel strength of the second sheet relative to the first sheet is excessively large, the second sheet may not separate easily from the sealing portion, and as a result, a portion of the sealing portion may be pulled by the second sheet to the extent a gap is formed between that portion and the electrode surface. In this case, as a result of the sealing portion being severed or even if not severed, as a result of a portion of the sealing portion being pulled as described above, the width of the pulled portion may become narrower or the first sheet itself may be partially stretched and become twisted as a result of being pulled, thereby causing a decrease in sealing performance at that portion. In contrast, in the laminated sheet of the present invention, as a result of making the peel strength of the second sheet relative to the first sheet 10.0 N/15 mm or less, the second sheet can be easily separated from the sealing portion. Consequently, a portion of the sealing portion is adequately inhibited from being pulled by the second sheet to the extent a gap is formed between that portion and the electrode surface, and as a result, decreases in sealing performance of the sealing portion are adequately inhibited.

Thus, according to the sealing laminated sheet of the present invention, together with being able to efficiently fix the sealing portion to an electrode surface by fixing the sealing portion to an electrode surface using the sealing laminated sheet, the sealing performance of the sealing portion can be adequately improved, thereby making it possible to stably produce an electronic device in which decreases in characteristics over time are adequately inhibited. Accordingly, according to the sealing laminated sheet of the present invention, the production efficiency of an electronic device can be improved and production yield can be adequately improved.

In addition, in the sealing laminated sheet of the present invention, the second sheet preferably has greater bending strength than the first sheet.

In this case, since the first sheet is laminated to the second sheet that has greater bending strength than the first sheet, deformation of the shape of the sealing portion is more adequately inhibited when forming the first sheet into an annular sealing portion and arranging this sealing portion on an electrode surface.

The acid-modified polyolefin-based thermoplastic resin contained in the first sheet is preferably an acid-modified polyethylene-based thermoplastic resin.

Since an acid-modified polyethylene-based thermoplastic resin has a comparatively low melting point among acid-modified polyolefin-based thermoplastic resins, it is easily adhered to an electrode surface by heating and melting.

The acid-modified polyethylene-based thermoplastic resin is preferably an ionomer, ethylene-methacrylic acid copolymer or maleic anhydride-modified polyethylene.

In this case, since adhesive strength between the first sheet and an electrode surface becomes stronger, the first sheet is more resistant to stretching even if pulled by the second sheet when the second sheet is separated from the first sheet, thereby enabling the formation of a stable sealing portion.

The second sheet preferably contains at least one type of polyester-based resin and polyamide-based resin.

In this manner, if the second sheet is a polyester-based resin or polyamide-based resin, the first sheet, which is an acid-modified polyolefin-based thermoplastic resin, and the second sheet are resistant to intermelting at their mutual interface even if heated to a temperature equal to or higher than the melting points of the first sheet and the second sheet. Furthermore, being resistant to intermelting refers to a state in which different types of thermoplastic resins do not mix together in the vicinity of their interface, thereby enabling the interface to be distinguished by grinding and observing a cross-section, even if placed in an environment at a temperature that greatly exceeds their mutual melting points.

The second sheet preferably contains polybutylene terephthalate or polyethylene naphthalate.

The first sheet is preferably formed of a laminate of a plurality of layers containing the acid-modified polyolefin-based thermoplastic resin.

In this case, decreases in sealing performance of the sealing portion tend to be more adequately inhibited in comparison with the case of the first sheet being composed of a single layer containing the acid-modified polyolefin-based thermoplastic resin.

Here, the first sheet is preferably formed of a laminate having a layer containing an ethylene-methacrylic acid copolymer and a layer containing an ionomer or maleic anhydride-modified polyethylene.

In this case, warping of the sealing laminated sheet of an electronic device can be adequately decreased, thereby facilitating positioning when arranging the sealing portion of the sealing laminated sheet on an electrode surface, and leading to an improvement in yield.

In addition, the sealing laminated sheet for an electronic device of the present invention is particularly useful for sealing in an electronic device composed of a sealing structure provided with a first base material, a second base material opposing the first base material, a sealed portion provided between the first base material and the second base material, and a sealing portion that connects the first base material and the second base material and seals the sealed portion.

In addition, the sealing laminated sheet for an electronic device of the present invention is particularly useful in the case in which the electronic device is a dye-sensitized solar cell or in the case the electronic device is an organic thin film solar cell, a liquid crystal display apparatus or an EL display apparatus.

In addition, the present invention is an electronic device production method comprising: a preparation step of preparing a first base material and a second base material, a sealing portion fixing step of fixing an annular sealing portion on at least one of the first base material and the second base material using the sealing laminated sheet for an electronic device as described above, a sealed portion formation step of forming a sealed portion on the inside of the sealing portion, and a sealing step of sealing the sealed portion with the sealing portion, the first base material and the second base material, wherein the sealing portion fixing step includes a step of obtaining a processed laminated sheet by processing the first sheet of the sealing laminated sheet for an electronic device to obtain an annular sealing portion, a step of arranging the processed laminated sheet on at least one of the first base material and the second base material so that the annular sealing portion contacts the base material, a step of heating and melting the annular sealing portion through the second sheet, and a step of separating the second sheet from the sealing portion.

Since the sealing laminated sheet for an electronic device is used in this production method, the production efficiency of an electronic device can be improved and production yield can also be adequately improved.

In the electronic device production method described above, the first base material may be a first electrode having a porous oxide semiconductor layer, the second base material may be a second electrode, the sealed portion may be an electrolyte layer composed of an electrolyte, the electronic device may be a dye-sensitized solar cell, a dye loading step of loading a photosensitive dye onto the porous oxide semiconductor layer may be present between the sealing portion fixing step and the sealed portion forming step, and the sealed portion formation step may be an electrolyte layer formation step of forming the electrolyte layer by arranging the electrolyte on the inside of the sealing portion. Namely, the electronic device production method can be applied to the production of a dye-sensitized solar cell.

Furthermore, in the present invention, "bending strength" is defined as the inverse of suspended length when a film strip measuring 10 mm×100 mm is produced in an environment at 20° C., a location 10 mm from the end of the long side thereof is fixed horizontally, and the remaining 90 mm are allowed to hang down naturally in the vertical direction. More precisely, since differences occur due to the effects of curling on the front and back of the film, a value is used that is the average of the value measured with one side facing up and the value measured with the other side facing up. Namely, in the case of a 75 micrometer polyethylene terephthalate film (to be referred to as Film 75) and a 110.0 micrometer polyethylene terephthalate film (to be referred to as Film 110.0), in contrast to the suspended length of Film 75 being 11 mm on the front and 3 mm on the back, since the suspended length of Film 110.0 was 0 mm on the front and 4 mm on the back, the suspended length of Film 75 is about 0.14 and the bending strength of Film 110.0 is 0.5, thereby indicating that the bending strength of Film 110.0 is stronger.

Effects of the Invention

According to the present invention, a sealing laminated sheet for an electronic device, which is capable of improving production efficiency of an electronic device as well as improving yield, and an electronic device production method using that laminated sheet, are provided.

BRIEF DESCRIPTION OF THE DRAWINGS

FIG. 2 is a cross-sectional view showing a first electrode used in a first embodiment of the electronic device production method relating to the present invention;

FIG. 8 is a cross-sectional view showing another step of a first embodiment of the electronic device production method relating to the present invention;

FIG. 11 is a cross-sectional view showing a sealing laminated sheet used in a third embodiment of the production method of the present invention;

MODE FOR CARRYING OUT THE INVENTION

The following provides a detailed explanation of embodiments of the present invention with reference to the drawings.

First Embodiment

First, an explanation is provided of an embodiment of the electronic device production method relating to the present invention using the drawings. Prior to explaining the electronic device production method, an explanation is first provided of electronic devices obtained by that production method.

Figure 1:
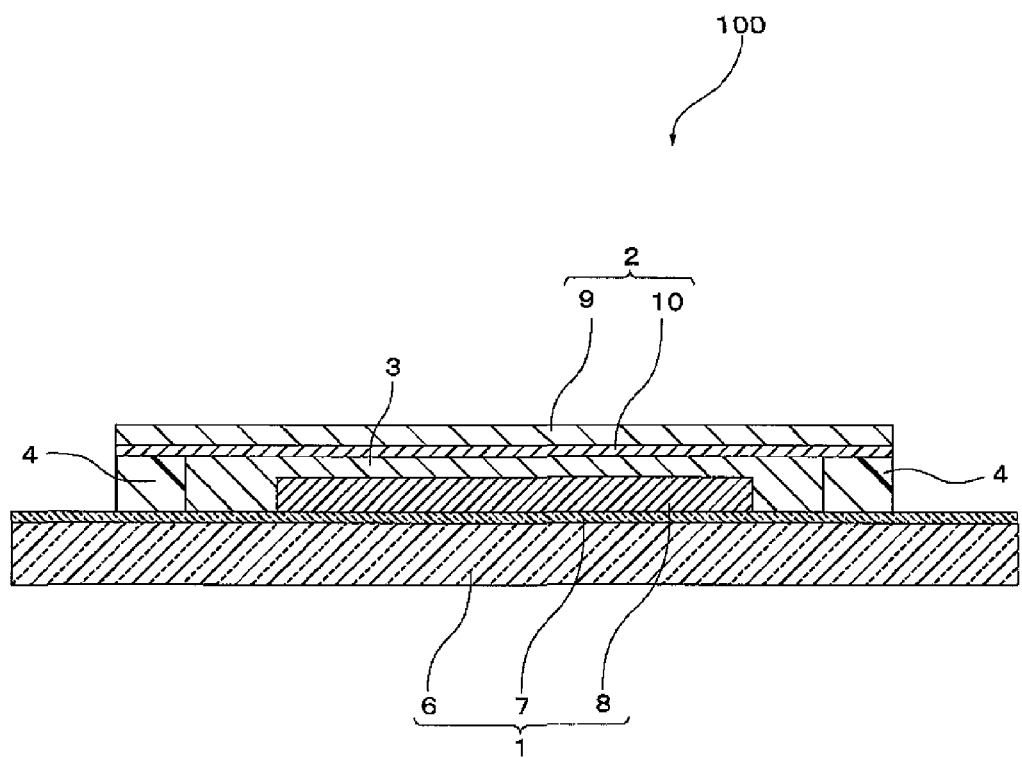
FIG. 1 is a cross-sectional view showing an electronic device obtained by a first embodiment of the electronic device production method relating to the present invention.
Figure 3:
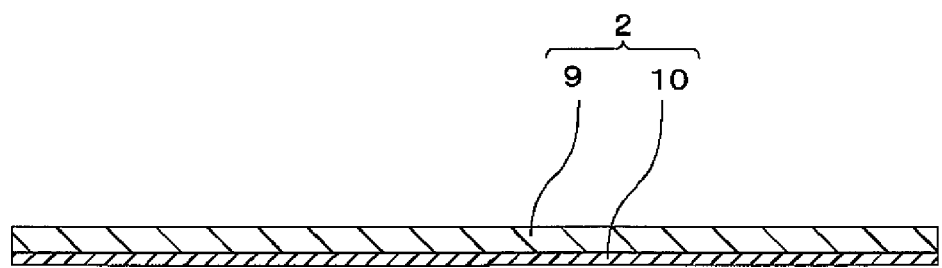
FIG. 3 is a cross-sectional view showing a second electrode used in a first embodiment of the electronic device production method relating to the present invention.

FIG. 1 is a cross-sectional view showing a dye-sensitized solar cell as an example of an electronic device obtained according to an embodiment of the electronic device production method relating to the present invention, FIG. 2 is a cross-sectional view showing the working electrode of FIG. 1, and FIG. 3 is a cross-sectional view showing the counter electrode of FIG. 1.

As shown in FIG. 1, a dye-sensitized solar cell 100 is provided with a working electrode 1 as a first base material, and a counter electrode 2 as a second base material arranged so as to oppose the working electrode 1. A photosensitive dye is loaded on the working electrode 1. The working electrode 1 and the counter electrode 2 are connected by sealing portion 4. An electrolyte is filled into a cell space surrounded by the working electrode 1, the counter electrode 2 and the sealing portion 4, and an electrolyte layer 3 is formed by this electrolyte. Thus, the dye-sensitized solar cell 100 composes a sealing structure in which the electrolyte layer 3 functions as a sealed portion.

As shown in FIG. 2, the working electrode 1 is provided with a transparent substrate 6, a transparent conductive film 7 provided on the transparent electrode 6 on the side of the counter electrode 2, and a porous oxide semiconductor layer 8 provided on the transparent conductive film 7. The photosensitive dye is loaded on the porous oxide semiconductor layer 8 of the working electrode 1. In addition, as shown in FIG. 3, the counter electrode 2 is provided with a counter electrode substrate 9, and an electrically conductive catalyst layer 10 provided on the counter electrode substrate 9 on the side of the working electrode 1 that promotes a reduction reaction on the surface of the counter electrode 2.

The sealing portion 4 connects the working electrode 1 and the counter electrode 2. The sealing portion 4 is fixed on the surface of the working electrode 1 on the side of the porous oxide semiconductor layer 8A, namely the surface of the transparent conductive film 7, and is fixed on the surface of the catalyst layer 10 of the counter electrode 2.

Figure 4:
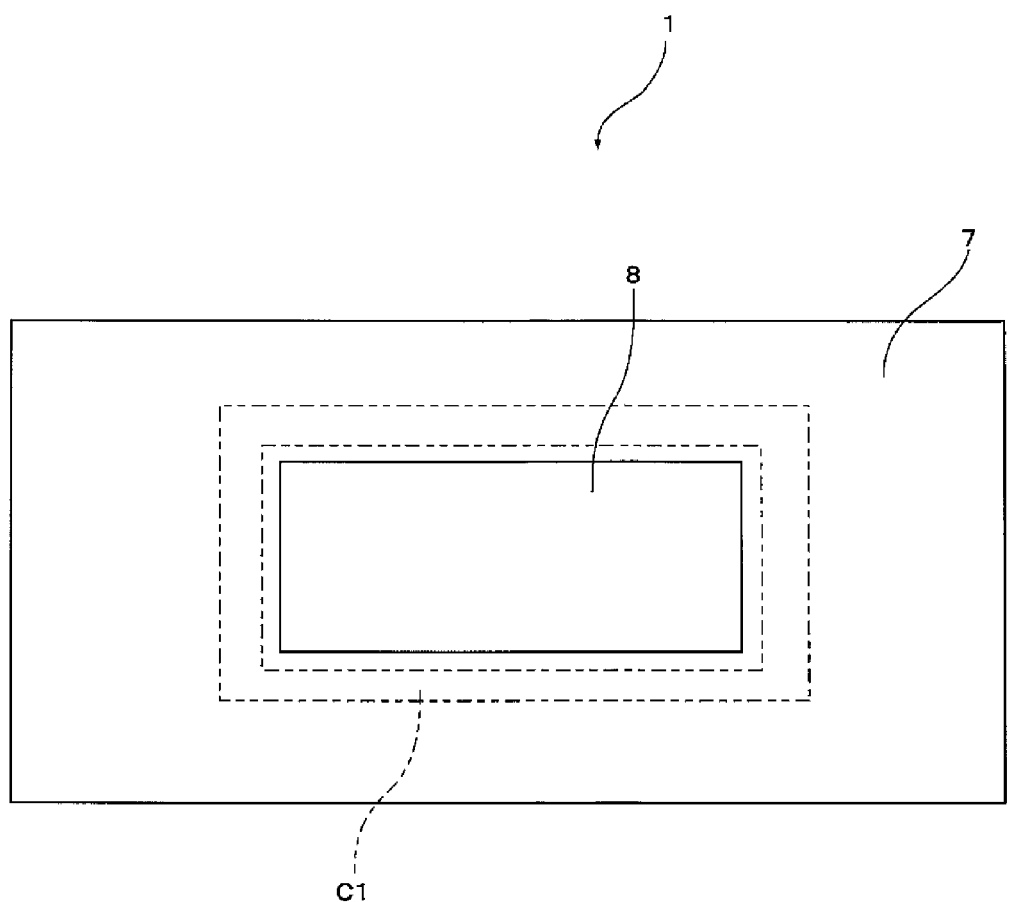
FIG. 4 is an overhead view showing the first electrode of FIG. 2.
Figure 5:
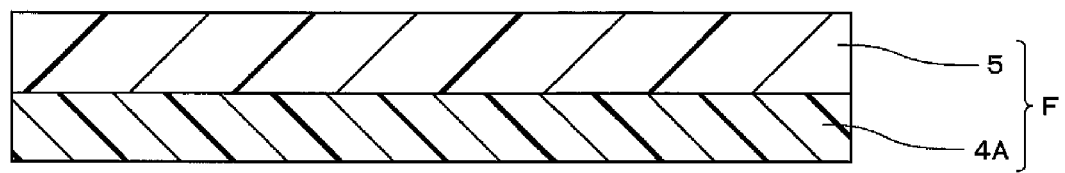
FIG. 5 is a cross-sectional view showing a first embodiment of a sealing laminated sheet used in the production method of the present invention.
Figure 6:
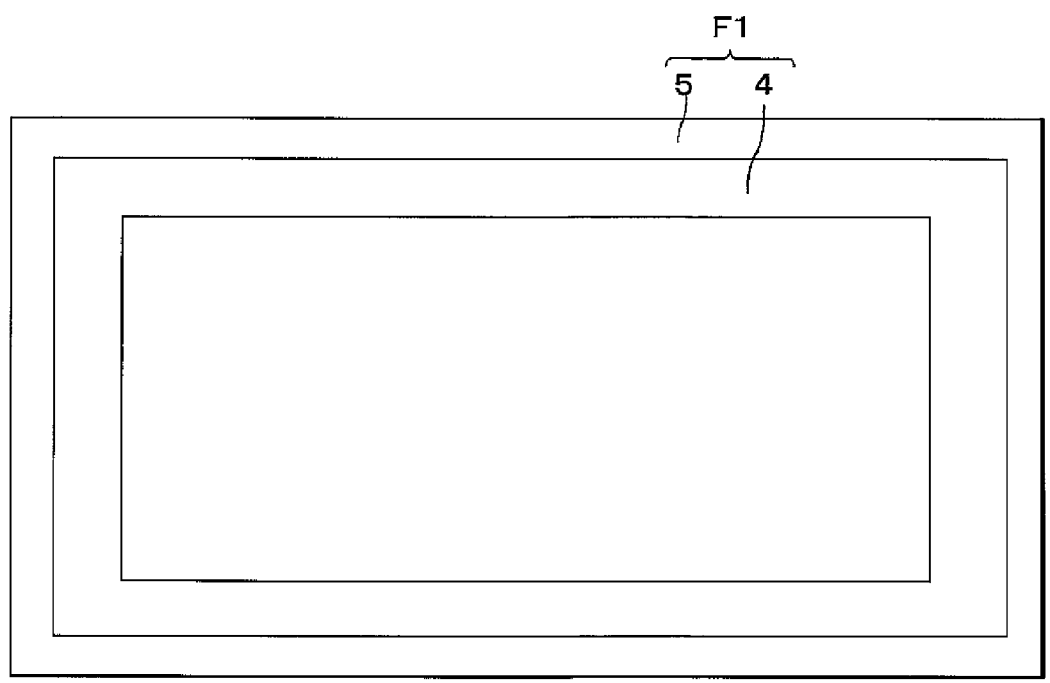
FIG. 6 is an overhead view showing a processed laminated sheet obtained by processing the sealing laminated sheet of FIG. 5.

Next, an explanation is provided of a production method of the above-mentioned dye-sensitized solar cell 100 using FIGS. 4 to 10. FIG. 4 is an overhead view showing the working electrode of FIG. 2, FIG. 5 is a cross-sectional view showing a sealing laminated sheet used in the present embodiment, FIG. 6 is an overhead view showing a processed laminated sheet obtained by processing the sealing laminated sheet of FIG. 5, and FIGS. 7 to 10 are cross-sectional views respectively showing one step of the production method of the present embodiment.

[Preparation Step]

First, the working electrode (first electrode) 1 and the counter electrode (second electrode 2) are prepared.

(Working Electrode)

The working electrode 1 can be obtained in the manner described below.

The transparent conductive film 7 is first formed on the transparent substrate 6. Examples of methods used to form the transparent conductive film 7 include sputtering, vapor deposition, spray pyrolysis decomposition (SPD) and CVD. Among these, spray pyrolysis decomposition is preferable in terms of equipment cost.

The material that composes the transparent substrate 6 is only required to be, for example, a transparent material, an examples of such transparent materials include glass such as borosilicate glass, soda-lime glass, glass which is made of soda lime and whose iron component is less than that of ordinary soda lime glass, or quartz glass, as well as polyethylene terephthalate (PET), polyethylene naphthalate (PEN), polycarbonate (PC) and polyether sulfone (PES). The thickness of the transparent substrate 6 is suitably determined corresponding to the size of the dye-sensitized solar cell 100, and although there are no particular limitations thereon, it is preferably within the range of, for example 50 to 10000 μm.

Examples of materials that compose the transparent conductive film 7 include conductive metal oxides such as indium-tin oxide (ITO), tin oxide ($SnO_2$) or fluorine-doped tin oxide (FTO). The transparent conductive film 7 may be composed of a single layer or a laminate of a plurality of layers composed of different conductive metal oxides. In the case the transparent conductive film 7 is composed of a single layer, the transparent conductive film 7 is preferably composed of FTO since this has high heat resistance and chemical resistance. In addition, it is preferable to use a laminate composed of a plurality of layers for the transparent conductive film 7 since it is possible to reflect the characteristics of each layer. In particular, it is preferable to use a laminate formed of a layer composed of ITO and a layer composed of FTO. In this case, the transparent conductive film 7 can be realized that has high electrical conductivity, heat resistance and chemical resistance. The thickness of the transparent conductive film 7 is within the range of, for example, 0.01 to 2 μm.

Next, a paste for forming a porous oxide semiconductor layer is printed onto the transparent conductive film 7. This paste for forming a semiconductor layer contains the above-mentioned oxide semiconductor particles as well as a resin such as polyethylene glycol and a solvent such as terpineol. Examples of methods that can be used to print the paste for forming the semiconductor layer include screen printing, doctor blade coating and bar coating.

Next, the paste for forming the semiconductor layer is baked to form the porous oxide semiconductor layer 8 on the transparent conductive film 7 (see FIG. 2). Although varying according to the oxide semiconductor particles, the baking temperature is normally 140 to 600° C., and although also varying according to the oxide semiconductor particles, the baking time is normally 1 to 5 hours.

Examples of the above-mentioned oxide semiconductor particles include titanium oxide ($TiO_2$), zinc oxide (ZnO), tungsten oxide ($WO_3$), niobium oxide ($Nb_2O_5$), strontium titanate ($SrTiO_3$), tin oxide ($SnO_2$), indium oxide ($In_3O_3$), zirconium oxide ($ZrO_2$), thallium oxide ($Ta_2O_5$), lanthanum oxide ($La_2O_3$), yttrium oxide ($Y_2O_3$), holmium oxide ($Ho_2O_3$), bismuth oxide ($Bi_2O_3$), cerium oxide ($CeO_2$), aluminum oxide ($Al_2O_3$) and oxide semiconductor particles composed of two or more types thereof. The mean particle diameter of these oxide semiconductor particles is preferably 1 to 1000 nm since the surface area of the oxide semiconductor covered with dye increases, or in other words the site for photoelectric conversion becomes larger, thereby enabling the generation of a larger number of electrons. Here, the porous oxide semiconductor layer 8 is preferably formed of a laminate obtained by laminating oxide semiconductor particles having different particle size distributions. In this case, reflection of light can be repeated induced within the laminate, thereby making it possible to efficiently convert light to electrons without allowing incident light to escape outside the laminate. The thickness of the porous oxide semiconductor layer 8 is, for example, 0.5 to 50 μm. Furthermore, the porous oxide semiconductor layer 8 can also be formed of a laminate having a plurality of semiconductor layers composed of different materials.

(Counter Electrode)

On the other hand, the counter electrode 2 can be obtained in the manner described below.

Namely, the counter electrode substrate 9 is first prepared. The catalyst layer 10 is then formed on the counter electrode substrate 9. Examples of methods used to form the catalyst layer 10 include sputtering and vapor deposition. Among these, sputtering is preferable in terms of film uniformity.

The counter electrode substrate 9 is composed of, for example, a corrosion-resistant metal material such as titanium, nickel, platinum, molybdenum or tungsten, a conductive oxide such as ITO or FTO, carbon or an electrically conductive polymer. The thickness of the counter electrode substrate 9 is suitably determined corresponding to the size of the dye-sensitized solar cell 100, and although there are no particular limitations thereon, it is, for example, 0.005 to 0.1 mm.

The catalyst layer 10 is composed of, for example, platinum, a carbon-based material or an electrically conductive polymer.

[Sealing Portion Fixing Step]

Next, as shown in FIGS. 4 to 8, the sealing portion 4 is fixed to an annular site C1 on the surface of the transparent conductive film 7 of the working electrode 1 that surrounds the porous oxide semiconductor layer 8 using a sealing laminated sheet F.

First, a detailed explanation is provided of the sealing laminated sheet F. As shown in FIG. 5, the sealing laminated sheet F is composed by laminating a first sheet 4A and a second sheet 5. Here, the first sheet 4A contains an acid-modified polyolefin-based thermoplastic resin, and the second sheet 5 contains a polyester-based resin or polyamide-based resin having a melting point higher than that of the first sheet 4A. In addition, the peel strength at 25° C. of the second sheet 5 relative to the first sheet 4A is 0.5 to 10.0 N/15 mm.

This sealing laminated sheet can be obtained by laminating the first sheet 4A and the second sheet 5 using a laminator, inflation method or T-die method.

The sealing laminated sheet F is specifically produced in the manner indicated below in order to make the peel strength at 25° C. of the second sheet 5 relative to the first sheet 4A 0.5 to 10.0 N/15 mm. Namely, in the case of laminating the first sheet 4A and the second sheet 5 with a laminator, the first sheet 4A and the second sheet 5 are first superimposed. Moreover, a first release sheet is superimposed on the first sheet 4A that can be easily separated there from, and second release sheet is superimposed on the second sheet 5 that can be easily separated there from. This group of four superimposed sheets is then passed through two sets of rollers A and B consisting of four rollers, and the group of sheets is pressed and heated by each of the sets of rollers A and B. The first release sheet and the second release sheet are then separated to obtain the sealing laminated sheet F. At this time, although the degrees to which the temperature and pressure of each set of the rollers A and B are set cannot be unconditionally defined since they vary according to the combination of the first sheet 4A and the second sheet 5, in the case, for example, the first sheet 4A is an ionomer and the second sheet 5 is polyethylene terephthalate, then the temperature of each set of rollers A and B may be, for example, 90 to 100° C. and the pressure may be, for example, 3 MPa.

On the other hand, in the case of laminating the first sheet 4A and the second sheet 5 by an inflation method, the first sheet 4A and the second sheet 5 are laminated by respectively extruding from two extruding machines. In this case, the die temperature in the extruding machines and screw rotating speeds of each extruding machine are adjusted to make the peel strength at 25° C. of the second sheet 5 relative to the first sheet 4A 0.5 to 10.0 N/15 mm. At this time, although the degrees to which the die temperature and screw rotating speed in each extruding machine are set cannot be unconditionally defined since they vary according to the combination of the first sheet 4A and the second sheet 5, in the case, for example, the first sheet 4A is an ionomer and the second sheet 5 is polybutylene terephthalate, then the die temperature of the first sheet 4A and the second sheet 5 in each extruding machine is 220 to 230° C. and 240 to 250° C., respectively, and the screw rotating speed in each extruding machine is, for example, about 30 rpm.

In the case of fixing the sealing portion 4 using the sealing laminated sheet F, the first sheet 4A of the sealing laminated sheet F is first processed using a metal mold to obtain the annular sealing portion 4 as shown in FIG. 6. More specifically, after inserting the metal mold blade into the first sheet 4A to make an annular cut therein, the unnecessary portion inside the annular cut is separated from the second sheet 5 and removed. When making a cut in the first sheet 4A with the metal mold, the metal mold blade is inserted until it reaches the second sheet 5. At this time, although a cut may end up being made in a portion of the second sheet 5, the blade must not make a cut into the entire portion of the second sheet 5 causing it to be severed in the present embodiment.

A processed laminated sheet F1 is thus obtained by processing the first sheet 4A of the laminated sheet to form the annular sealing portion 4. A cutting plotter and the like can also be used instead of using a metal mold as described above.

Figure 7:
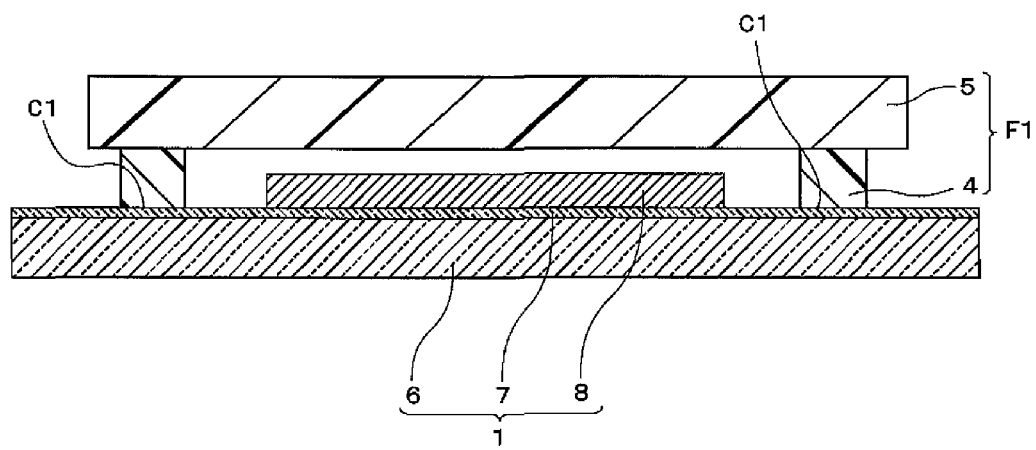
FIG. 7 is a cross-sectional view showing one step of a first embodiment of the electronic device production method relating to the present invention.

Next, as shown in FIG. 7, the processed laminated sheet F1 is arranged in opposition to the working electrode 1 so that the annular sealing portion 4 contacts the annular site C1. Namely, the processed laminated sheet F1 is arranged so that the porous oxide semiconductor layer 8 is surrounded by the annular sealing portion 4, and the second sheet 5 and the porous oxide semiconductor layer 8 are opposed.

At this time, the sealing portion 4 is preferably adhered and fixed to the working electrode 1 in the manner described below. Namely, the working electrode 1 is first housed inside a pressure reduction vessel having an opening. At this time, the working electrode 1 is arranged so that the porous oxide semiconductor layer 8 is facing the opening. Continuing, a sealed space is formed by covering the opening of the depressurized space with the second sheet 5, and this sealed space is depressurized with a vacuum pump and the like. As a result, the second sheet 5 bends and the sealing portion 4 eventually contacts the annular site C1 of the working electrode 1, thereby obtaining a laminate. As a result, the space surrounded by the second sheet 5, the sealing portion 4 and the working electrode 1 is at negative pressure. Consequently, when the laminate is taken out of the pressure reduction vessel under atmospheric pressure, the sealing portion 4 is pressed against the annular site C1 of the working electrode 1 via the second sheet 5 due to atmospheric pressure, and the sealing portion 4 is adhered and fixed to the working electrode 1.

At this time, the pressure reduction vessel is normally reduced in pressure to 1000 hPa or less and preferably 800 hPa or less in order to more adequately adhere the sealing portion 4 to the working electrode 1.

Next, the sealing portion 4 is heated and melted through the second sheet 5. The sealing portion 4 is thus adhered to the annular site C1 of the working electrode 1. At this time, since the sealing portion 4 is adhered to the working electrode 1 in the case the space surrounded by the sealing portion 4, the working electrode 1 and the second sheet 5 is at negative pressure, the sealing portion 4 can be strongly adhered to the working electrode 1 by heating and melting the sealing portion 4 while in this state.

However, the temperature when heating and melting the sealing portion 4 is preferably lower than the melting point of the second sheet 5. In this case, melting of the second sheet 5 is prevented, thereby making it possible to adequately inhibit deformation of the second sheet 5 causing it to adhere to the porous oxide semiconductor layer 8 of the working electrode 1 as well as deviations in the peel strength of the second sheet 5 relative to the sealing portion 4 from the initial value thereof.

Next, the second sheet 5 is separated from the sealing portion 4 as shown in FIG. 8. The annular sealing portion 4 is thus fixed to the annular site C1.

The following effects are obtained with this sealing laminated sheet F. First, when the sealing laminated sheet F is pulled from the first sheet 4A after having inserted a blade of a metal mold into the first sheet 4A of the sealing laminated sheet F and completely severed the first sheet 4A, because the peel strength at 25° C. of the second sheet 5 relative to the first sheet 4A is made to be 0.5 N/15 mm or more in the sealing laminated sheet F, the metal mold can be easily pulled out without causing separation of the first sheet 4A from the second sheet 5. Consequently, the blade of the metal mold is easily pulled out from the first sheet 4A thereby making processing work on the first sheet 4A extremely easy. Moreover, when separating unnecessary portions of the first sheet 4A from the second sheet 5 as well, not only are the unnecessary portions separated easily, but the necessary portion of the first sheet 4A that serves as the sealing portion 4 is suitably adhered to the second sheet 5, thereby facilitating processing work.

In addition, when arranging the processed sealing laminated sheet F1 on the surface of the working electrode 1, although strength is inadequate and it becomes difficult for the annular sealing portion 4 to stably retain its own shape in the case of using the annular sealing portion 4 alone, the sealing portion 4 is reinforced by laminating on the second sheet 5. Consequently, the sealing portion 4 can be arranged on the surface of the working electrode 1 while stably maintaining its shape. Thus, in comparison with the case in which the sealing portion 4 is arranged on the surface of the working electrode 1 in a state in which its shape is not stably maintained, such as being arranged thereon while in a twisted state, and is then adhered by being heated and melted while still in that state, the annular sealing portion 4 can be arranged on the surface of the working electrode 1 in a state in which its width along the circumferential direction thereof remains nearly constant.

Moreover, in the case of heating and melting the annular sealing portion 4 through the second layer 5, since the second layer 5 has a melting point that is higher than that of the first sheet 4A, the second sheet 5 is more resistant to melting than the sealing portion 4. Consequently, changes in peel strength of the second sheet 5 relative to the first sheet 4A can be adequately inhibited.

Moreover, when separating the second sheet 5 from the sealing portion 4 after having heated and melted the annular sealing portion 4, the second sheet 5 can be easily separated from the sealing portion 4. More specifically, since the acid-modified polyolefin-based thermoplastic resin contained in the sealing portion 4 has polar groups such as carboxyl groups or maleic anhydride groups in a molecule thereof, it easily adheres to compounds having hydroxyl groups in the manner of metal oxides by hydrogen bonding. An electrically conductive metal oxide is used in the transparent conductive film 7 of the working electrode 1 used in the dye-sensitized solar cell 100. Consequently, the acid-modified polyolefin-based thermoplastic resin easily bonds with the transparent conductive film 7 by hydrogen bonding. Consequently, the sealing portion 4 is strongly adhered to the surface of the working electrode 1 by heating and melting. Thus, when the second sheet 5 is separated from the sealing portion 4, separation of the sealing portion 4 from the surface of the working electrode 1 is adequately prevented. In this case, if the peel strength of the second sheet 5 relative to the first sheet 4A is excessively large, the second sheet 5 does not separate easily from the sealing portion 4, and a portion of the sealing portion 4 is pulled by the second sheet 5 to the extent that a gap is formed between that portion and the surface of the working electrode 1. In this case, as a result of the sealing portion 4 being severed, or even if not severed, as a result of a portion of the sealing portion 4 being pulled in the manner described above, the width of the pulled portion may become narrower or, as a result of having been pulled, the first sheet itself may be partially stretched or twisted, thereby causing a decrease in the sealing performance at that portion. In contrast, in the sealing laminated sheet F of the present embodiment, the second sheet 5 can be easily separated from the sealing portion 4 by making the peel strength at 25° C. of the second sheet 5 relative to the first sheet 4A 10.0 N/15 mm or less. Consequently, pulling on a portion of the sealing portion 4 by the second sheet 5 to the extent that a gap is formed between that portion and the surface of the working electrode 1 is adequately inhibited, and as a result thereof, decreases in sealing performance of the sealing portion 4 are adequately inhibited. Moreover, if the peel strength is 5.0 N/15 mm or less, the second sheet 5 can be separated more easily from the sealing portion 4, thereby resulting in superior workability.

Although examples of the acid-modified polyolefin-based thermoplastic resin contained in the first sheet 4A described above include acid-modified polyethylene-based thermoplastic resins and acid-modified propylene-based thermoplastic resins, among these, an acid-modified polyethylene-based thermoplastic resin is particularly preferable. If an acid-modified polyethylene-based thermoplastic resin is used for the acid-modified polyolefin-based thermoplastic resin, adhesion to an electrode surface by heating and melting is facilitated since the melting point of an acid-modified polyethylene-based thermoplastic resin is lower than that of other acid-modified polyolefin-based thermoplastic resins. Here, a polyethylene-based thermoplastic resin refers to a thermoplastic resin containing ethylene as a constituent unit thereof.

Although examples of acid-modified polyethylene-based thermoplastic resins include ionomers, ethylene-methacrylic acid copolymer, maleic anhydride-modified polyethylene and ethylene-acrylic acid copolymer, ionomers, ethylene-methacrylic acid copolymer and maleic anhydride-modified polyethylene are particularly preferable since they demonstrates high adhesiveness with the working electrode 1. Furthermore, an acid-modified polyolefin refers to that in which an acid is random copolymerized, alternating copolymerized, block copolymerized or graft copolymerized to a polyolefin, or that in which these are neutralized with metal ion. In addition, an acid-modified polyethylene refers to that in which an acid is random polymerized, alternating copolymerized, block copolymerized or graft copolymerized to polyethylene, or that in which these are neutralized with metal ion. As an example thereof, since an ethylene-methacrylic acid copolymer is the product of copolymerizing ethylene and methacrylic acid, it is an acid-modified polyethylene, while an ionomer in which an ethylene-methacrylic acid copolymer is neutralized with metal ion is also an acid-modified polyethylene.

The second sheet 5 is only required to be a polyester-based resin or polyamide-based resin that has a melting point higher than that of the first sheet A4, and although examples of materials contained in the second sheet 5 include polybutylene terephthalate, polyethylene terephthalate, polymethylterpene, polyhexane dimethylene terephthalate, polybutylene naphthalate, polyethylene naphthalate, PA6 and PA66, among these, polybutylene terephthalate or polyethylene naphthalate is particularly preferable.

In this case, there is little shrinkage of the polybutylene terephthalate and polyethylene naphthalate by heat. Moreover, since polybutylene terephthalate has superior moldability, it is more preferable for the second sheet. Consequently, when the first sheet 4A is processed into the annular sealing portion 4 and then arranged on the surface of the working electrode 1 followed by heating and melting the sealing portion 4 through the second sheet 5, there is little shrinkage of the sealing portion 4 accompanying shrinkage of the second sheet 5, and the sealing portion 4 can be adequately inhibited from shifting from a desired location. Consequently, for example, the sealing portion 4 is adequately prevented from adhering so as to superimpose the porous oxide semiconductor layer 8, and production yield of the dye-sensitized solar cell 100 can be more adequately improved.

From the viewpoint of not allowing the second sheet 5 and the first sheet 4A to mutually intermelt, the difference in melting points between the second sheet 5 and the first sheet 4A is preferably 50 to 200° C. and more preferably 70 to 200° C.

In addition, the bending strength of the second sheet 5 is preferably greater than the bending strength of the first sheet 4A. In this case, in the processed laminated sheet F1, the shape of the sealing portion 4 is more adequately reinforced by the second sheet 5. Making the bending strength of the second sheet 5 greater than the bending strength of the first sheet 4A can be easily realized by, for example, making the thickness of the second sheet 5 greater than that of the first sheet 4A. In addition, although other methods are commonly known for making the bending strength of the second sheet 5 greater than that of the first sheet 4A, such as by using a polyethylene terephthalate, polyethylene naphthalate or polybutylene terephthalate having comparatively high rigidity among polyester-based resins or polyamide-based resins, reinforcing by containing glass fiber, glass cloth or metal mesh in the resin, or increasing the strength of crosslinks in the resin by adding a crosslinking material, increasing the sheet thickness as described above is the easiest. In addition, increasing thickness also offers the advantage of facilitating control of penetration depth of the metal mold blade when processing the sealing laminated sheet with a metal mold.

[Dye Loading Step]

Next, a photosensitive dye is loaded onto the porous oxide semiconductor layer 8 of the working electrode 1. In order to accomplish this, the photosensitive dye is adsorbed onto the porous oxide semiconductor layer 8 by immersing the working electrode 1 in a solution containing the photosensitive dye to adsorb the dye onto the porous oxide semiconductor layer 8 followed by rinsing off excess dye with a solvent component of the above-mentioned solution and drying. However, the photosensitive dye can also be loaded onto the porous oxide semiconductor layer 8 by adsorbing the photosensitive dye onto an oxide semiconductor porous film by coating a solution containing the photosensitive dye onto the porous oxide semiconductor layer 8 followed by drying.

Examples of photosensitive dyes include ruthenium complexes having a ligand containing a bipyridine structure or terpyridine structure, and organic dyes such as porphyrin, eosin, rhodamine or merocyanine.

[Electrolyte Layer Formation Step]

Figure 9:
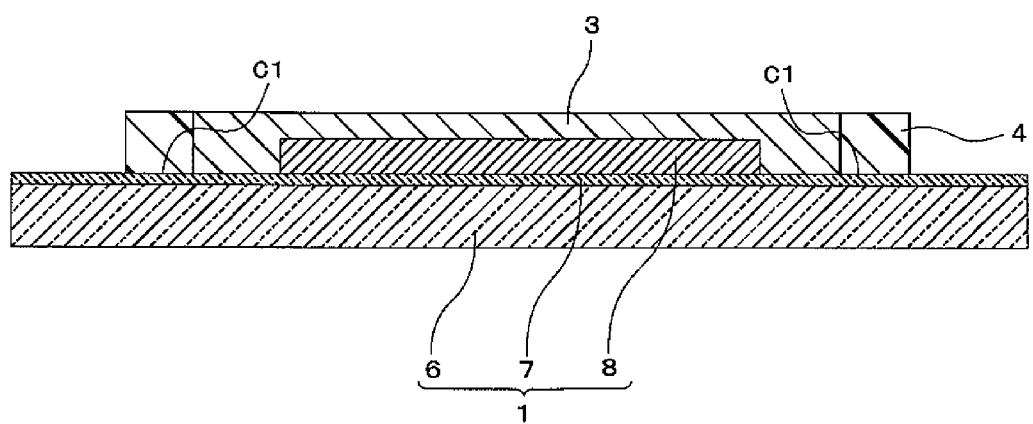
FIG. 9 is a cross-sectional view showing still another step of a first embodiment of the electronic device production method relating to the present invention.

Next, as shown in FIG. 9, an electrolyte is arranged on the working electrode 1 to the inside of the sealing portion 4 to form the electrolyte layer 3. The electrolyte layer 3 can be obtained by injecting or printing an electrolyte to the inside of the sealing portion 4 on the working electrode 1.

Here, in the case the electrolyte is a liquid, the electrolyte is preferably injected until it overflows beyond the sealing portion 4 to the outside of the sealing portion 4. In this case, the electrolyte can be adequately injected to the inside of the sealing portion 4. In addition, when adhering the sealing portion 4 and the counter electrode 2, air can be adequately evacuated from the cell space surrounded by the working electrode 1, the counter electrode 2 and the sealing portion 4, thereby making it possible to adequately improve photoelectric conversion efficiency.

The electrolyte is normally composed of an electrolyte solution, and this electrolyte solution contains, for example, a redox couple such as $I^-/I_3^-$ and an organic solvent. Examples of organic solvents that can be used include acetonitrile, methoxyacetonitrile, methoxypropionitrile, propionitrile, ethylene carbonate, propylene carbonate, diethyl carbonate and γ-butyrolactone. In addition to $I^-/I_3^-$, examples of redox couples include a bromine/bromide ion couple. The dye-sensitized solar cell 100 is particularly effective in the case of using for the electrolyte an electrolyte solution containing a volatile solute in the manner of $I^-/I_3^-$ for the redox couple and an organic solvent that easily volatilizes at high temperatures in the manner of acetonitrile, methoxyacetonitrile or methoxypropionitrile. This is because, in this case, changes in internal pressure of the cell space attributable to changes in the ambient temperature surrounding the dye-sensitized solar cell 100 become particularly large, thereby facilitating the leakage of electrolyte from the interface between the sealing portion 4 and the counter electrode 2 and the interface between the sealing portion 4 and the working electrode 1. Furthermore, a gelling agent may also be added to the volatile solvent. In addition, the electrolyte may be composed of an ionic liquid electrolyte composed of a mixture of an ionic liquid and a volatile component. In this case as well, this is because changes in internal pressure of the cell space attributable to changes in ambient temperature surrounding the dye-sensitized solar cell 100 become large. Known iodine salts that are room temperature molten salts in a molten state in the vicinity of room temperature are used for the ionic liquid, examples of which include pyridinium salts, imidazolium salts and triazolium salts. An example of such a room temperature molten salt that is used preferably is 1-ethyl-3-methylimidazolium bis(trifluoromethylsulfonyl)imide. In addition, examples of volatile components include the above-mentioned organic solvents, 1-methyl-3-methylimidazolium iodide, LiI, $I_2$ and 4-t-butylpyridine. Moreover, a nanocomposite ion-gel electrolyte, which is a pseudo-solid electrolyte that becomes gel-like by mixing nanoparticles such as $SiO_2$, $TiO_2$ or carbon nanotubes with the above-mentioned ionic liquid electrolyte, may also be used for the electrolyte 3, or a gelled ionic liquid electrolyte, obtained by using an organic gelling agent such as polyvinylidene fluoride, polyethylene oxide derivative or amino acid derivative, may also be used.

[Sealing Step]

Figure 10:
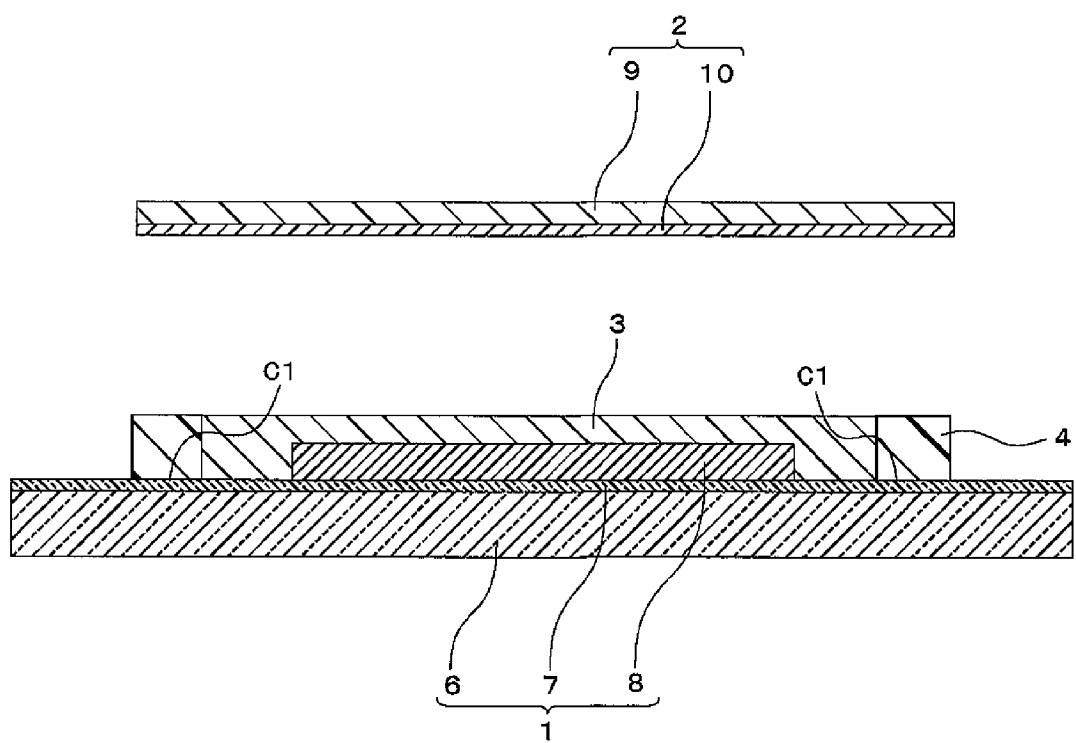
FIG. 10 is a cross-sectional view showing yet still another step of a first embodiment of the electronic device production method relating to the present invention.

Next, the working electrode 1 and the counter electrode 2 are opposed under atmospheric pressure as shown in FIG. 10. The sealing portion 4 and the counter electrode 2 are then adhered by melting the sealing portion 4 while applying pressure under atmospheric pressure. Namely, the electrolyte layer 3 is sealed by the working electrode 1, the counter electrode 2 and the sealing portion 4. The sealing portion 4 is thus formed between the working electrode 1 and the counter electrode 2 (see FIG. 1).

At this time, pressure is normally applied to the sealing portion 4 at 0.1 to 10 MPa, preferably 1 to 8 MPa and more preferably 3 to 8 MPa.

In addition, the temperature when melting the sealing portion 4 is equal to or higher than the melting point of the thermoplastic resin that forms the sealing portion 4. Since the thermoplastic resin that forms the sealing portion 4 does not melt if the temperature is lower than the melting point of the thermoplastic resin, the sealing portion 4 can no longer be formed by adhering the sealing portion 4 and the counter electrode 2.

However, the temperature when melting the sealing portion 4 is preferably equal to or lower than the melting point of the thermoplastic resin+20° C. If the temperature exceeds the melting point of the thermoplastic resin+20° C., there is the risk of decomposition of the thermoplastic resin contained in the sealing portion 4 by heat.

The dye-sensitized solar cell 100 is obtained in this manner.

According to the production method of the dye-sensitized solar cell 100 as described above, together with being able to efficiently fix the sealing portion 4 to the surface of the working electrode 1 by fixing the sealing portion 4 to the surface of the working electrode 1 by using the sealing laminated sheet F, the sealing performance of the sealing portion 4 can be adequately improved, and the dye-sensitized solar cell 100 in which decreases in photoelectric conversion efficiency over time are adequately inhibited can be stably produced. Accordingly, the production method of the dye-sensitized solar cell 100 makes it possible to improve production efficiency of the dye-sensitized solar cell 100 as well as adequately improve production yield.

In addition, the sealing portion 4 is fixed prior to forming the electrolyte layer 3 in the production method of the dye-sensitized solar cell 100. Consequently, when fixing the sealing portion 4 to the annular site C1 of the working electrode 1, volatile components in the electrolyte do not adhere to the annular site C1 and wettability of the surface thereof does not decrease. Thus, the thermoplastic resin is strongly adhered to the annular site C1 and the sealing portion 4 is strongly fixed to the annular site C1.

In this manner, the sealing portion 4 is strongly adhered to the annular site C1 of the working electrode 1 in the production method of the dye-sensitized solar cell 100. Thus, leakage of volatile components in the electrolyte is adequately inhibited in the resulting dye-sensitized solar cell 100. Accordingly, this also is able to contribute to improvement of production yield of the dye-sensitized solar cell 100.

In addition, in the electrolyte layer formation step of the present embodiment, the electrolyte layer 3 is formed to the inside of the sealing portion 4 on the working electrode 1. Consequently, the sealing portion 4 is formed after the electrolyte has adequately spread throughout minute pores of the porous oxide semiconductor layer 8. Consequently, the appearance of air inside the porous oxide semiconductor layer 8 in the form of bubbles is adequately inhibited, and photoelectric conversion efficiency can be more adequately improved.

Second Embodiment

Next, an explanation is provided of a second embodiment of a production method of a dye-sensitized solar cell relating to the present invention with reference to the drawings.

The production method of the present embodiment differs from the production method of the first embodiment, in which the sealing portion 4 is adhered under atmospheric pressure, in that the sealing portion 4 is adhered in a depressurized space.

In this case, the electrolyte layer 3 can be put at negative pressure relative to the outside air when the resulting dye-sensitized solar cell 100 is taken out into the air. Consequently, the dye-sensitized solar cell 100 is subjected to atmosphere pressure from the outside, and the state in which the working electrode 1 and the electrode 2 apply pressing force to the sealing portion 4 is maintained. As a result, leakage of volatile components in the electrolyte layer 3 can be more adequately inhibited.

The above-mentioned depressurized space can be formed in, for example, the manner described below.

Namely, the working electrode 1 provided with the sealing portion 4 is first housed in a pressure reduction vessel having an opening by passing through that opening. Continuing, an electrolyte is injected to the inside of the sealing portion 4 to form the electrolyte layer 3. Subsequently, the counter electrode 2 is also housed in the pressure reduction vessel, the working electrode 1 and the counter electrode 2 are opposed within the pressure reduction vessel, and the sealing portion 4 and the counter electrode 2 are superimposed. Next, the opening of the pressure reduction vessel is covered with a flexible sheet composed of a resin such as PET to form a sealed space inside the pressure reduction vessel. The pressure within the sealed space is then reduced through an exhaust hole (not shown) formed in the pressure reduction vessel with a vacuum pump, for example. The depressurized space is formed in this manner.

When the depressurized space is formed in this manner, the counter electrode 2 is pressed by the above-mentioned flexible sheet. Accompanying this, the sealing portion 4 is sandwiched and pressed between the working electrode 1 and the counter electrode 2. At this time, the sealing portion 4 and the counter electrode 2 are adhered by heating the pressure reduction vessel and melting the sealing portion 4 while applying pressure thereto.

At that time, the pressure of the depressurized space is normally within the range of 50 Pa or more to less than 1013 hPa, preferably 50 Pa to 800 hPa and more preferably 300 to 800 hPa.

In the case the organic solvent contained in the electrolyte is a volatile solvent in particular, the pressure within the depressurized space is preferably 700 to 1000 hPa and more preferably 700 to 800 hPa. If the pressure is within the above ranges, together with volatilization of the organic solvent being inhibited more when forming the electrolyte layer 3 to the inside of the sealing portion 4 as compared with the case of the pressure being outside the above ranges, there is less likelihood of the occurrence of leakage of the electrolyte layer 3 since the working electrode 1, the counter electrode 2 and the sealing portion 4 are strongly fixed in the resulting dye-sensitized solar cell 100.

In addition, in the case the electrolyte contains an ionic liquid, since ionic liquids are not volatile, it is not necessary to raise the pressure inside the depressurized space in consideration of volatilization of the electrolyte as in the case in which the electrolyte contains a volatile solvent. Consequently, the pressure inside the depressurized space may be 500 to 700 hPa.

Moreover, in the case the electrolyte contains a gel electrolyte, since the case in which the main component of the gelled precursor is a volatile type differs from the case in which it is an ionic liquid type, the pressure inside the depressurized space in the case the main component of the precursor is a volatile type is preferably 600 to 800 hPa, and preferably 500 to 700 hPa in the case it is an ionic liquid type. Thus, in the case the electrolyte layer 3 contains a gel electrolyte, the pressure inside the depressurized space is preferably 500 to 800 hPa.

In addition, in the case of adhering the sealing portion 4 to the counter electrode 2 in the manner described above inside a depressurized space, at least one of the working electrode 1 and the counter electrode 2 has flexibility.

In this case, in comparison with the case of neither of the working electrode 1 and the counter electrode 2 having flexibility, the electrode among the working electrode 1 and the counter electrode 2 that has flexibility is deflected by the atmospheric pressure when taken out of the depressurized space and placed under atmospheric pressure, thereby causing the interval between the working electrode 1 and the counter electrode 2 to decrease. As a result, in comparison with the case of neither of the working electrode 1 and the counter electrode 2 having flexibility, photoelectric conversion is carried out more efficiently and photoelectric conversion efficiency is further improved.

Incidentally, an electrode consisting of the working electrode 1 or the counter electrode 2 "having flexibility" refers to that in which a maximum deformation rate of electrode deflection is greater than 20% when both edges in the lengthwise direction of a sheet-like electrode measuring 50 mm×200 mm (width of 5 mm each) are fixed horizontally at tension of 1 N in an environment at 20° C. and a 20 g load is applied to the center of the electrode. Here, maximum deformation rate refers to a value calculated based on the following formula:

Maximum deformation rate(%)=100×(maximum displacement/thickness of sheet-like electrode)

Thus, in the case, for example, a sheet-like electrode having a thickness of 0.04 mm is deflected by applying a load as described above and the maximum displacement is 0.01 mm, then the maximum deformation rate becomes 25%, and this sheet-like electrode has flexibility.

Third Embodiment

Next, an explanation is provided of a third embodiment of an electronic device production method relating to the present invention with reference to the drawings.

The production method of the present embodiment differs from the production method of the first or second embodiment in that the first sheet in the sealing laminated sheet is formed of a laminate having a plurality of layers containing an acid-modified polyolefin-based thermoplastic resin.

In this case, in comparison with the case in which the first sheet is composed of a single layer containing the acid-modified polyolefin-based thermoplastic resin, decreases in sealing performance of the sealing portion tend to be more adequately inhibited.

FIG. 11 is a cross-sectional view showing an example of a sealing laminated sheet used in the production method of the present embodiment. As shown in FIG. 11, in a sealing laminated sheet F3, the first sheet 4A has a first layer 4A1 that contains an acid-modified polyolefin-based thermoplastic resin, and a second layer 4A2 that contains an acid-modified polyolefin-based thermoplastic resin. The first layer 4A1 and the second layer 4A2 are mutually adhered. The second layer 4A2 is adhered to the second sheet 5, and the first layer 4A1 is provided on the second sheet 4A2 on the opposite side from the second sheet 5. Here, the acid-modified polyolefin-based thermoplastic resin of the first layer 4A1 and the acid-modified polyolefin-based thermoplastic resin of the second layer 4A2 are mutually different. An acid-modified polyolefin-based thermoplastic resin similar to that of the first embodiment can be used for the acid-modified polyolefin-based thermoplastic resins.

This sealing laminated sheet F3 can be obtained by laminating the first sheet 4A1, the second sheet 4A2 and the second sheet 5 using a laminator, inflation method or T-die method.

The sealing laminated sheet F3 is specifically produced in the manner described below in order to make the peel strength at 25° C. of the second sheet 5 relative to the first sheet 4A 0.5 to 10.0 N/15 mm. Namely, in the case of laminating a sheet for forming the first layer 4A1 (to be referred to as the "first layer forming sheet"), a sheet for forming the second sheet 4A2 (to be referred to as the "second layer forming sheet") and the second sheet 5 with a laminator, the first layer forming sheet, the second layer forming sheet and the second sheet 5 are first superimposed. Moreover, a first release sheet, which is easily separated from the first layer forming sheet, is then superimposed on the first layer forming sheet, and a second release sheet, which is easily separated from the second sheet 5, is superimposed on the second sheet 5. The group of sheets composed of these five sheets is then passed through two sets of rollers A and B consisting of four rollers, and the group of sheets is pressed and heated by each of the sets of rollers A and B. The first release sheet and the second release sheet are then separated to obtain the sealing laminated sheet F3. At this time, although the degrees to which the temperature and pressure of each set of the rollers A and B are set cannot be unconditionally defined since they vary according to the combination of the first layer forming sheet, the second layer forming sheet and the second sheet 5, in the case, for example, the first layer forming sheet is an ionomer, the second layer forming sheet is an ethylene-methacrylic acid copolymer, and the second sheet 5 is polybutylene terephthalate, then the temperature of each set of rollers A and B may be, for example, 90 to 100° C. and the pressure may be, for example, 3 MPa.

On the other hand, in the case of laminating the first layer forming sheet, the second layer forming sheet and the second sheet 5 by an inflation method, the first layer forming sheet, the second layer forming sheet and the second sheet 5 are laminated by respectively extruding from three extruding machines. In this case, the die temperature in the extruding machines and screw rotating speeds of each extruding machine are adjusted to make the peel strength at 25° C. of the second sheet 5 relative to the second layer forming sheet 0.5 to 10.0 N/15 mm. At this time, although the degrees to which the die temperature and screw rotating speed in each extruding machine are set cannot be unconditionally defined since they vary according to the combination of the first layer forming sheet, the second layer forming sheet and the second sheet 5, in the case, for example, the first layer forming sheet is an ionomer, the second layer forming sheet is an ethylene-methacrylic acid copolymer, and the second sheet 5 is polybutylene terephthalate, then the die temperature of the first layer forming sheet, the second layer forming sheet and the second sheet 5 in each extruding machine is 220 to 230° C., 190 to 220° C. and 240 to 250° C., respectively, and the screw rotating speed in each extruding machine is, for example, about 30 rpm.

From the viewpoint of not allowing the second sheet 5 and the second layer 4A2 to mutually intermelt, the difference in melting points between the second sheet 5 and the second layer 4A2 of the first sheet 4A is preferably 50 to 200° C. and more preferably 70 to 200° C.

Here, the first layer 4A1 is preferably a layer that contains an ethylene-methacrylic acid copolymer, and the second layer 4A2 is preferably a layer that contains an ionomer or maleic anhydride-modified polyethylene. Here, the first layer 4A1 may also be a layer that contains an ionomer or maleic anhydride-modified polyethylene, and the second layer 4A2 may also be a layer that contains an ethylene-methacrylic acid copolymer. In this case, warping of the sealing laminated sheet of the dye-sensitized solar cell 100 can be adequately reduced. The peel strength at 25° C. of the first layer 4A1 relative to the second layer 4A2 is preferably greater than the peel strength at 25° C. of the first sheet 4A relative to the second sheet 5.

Fourth Embodiment

Figure 12:
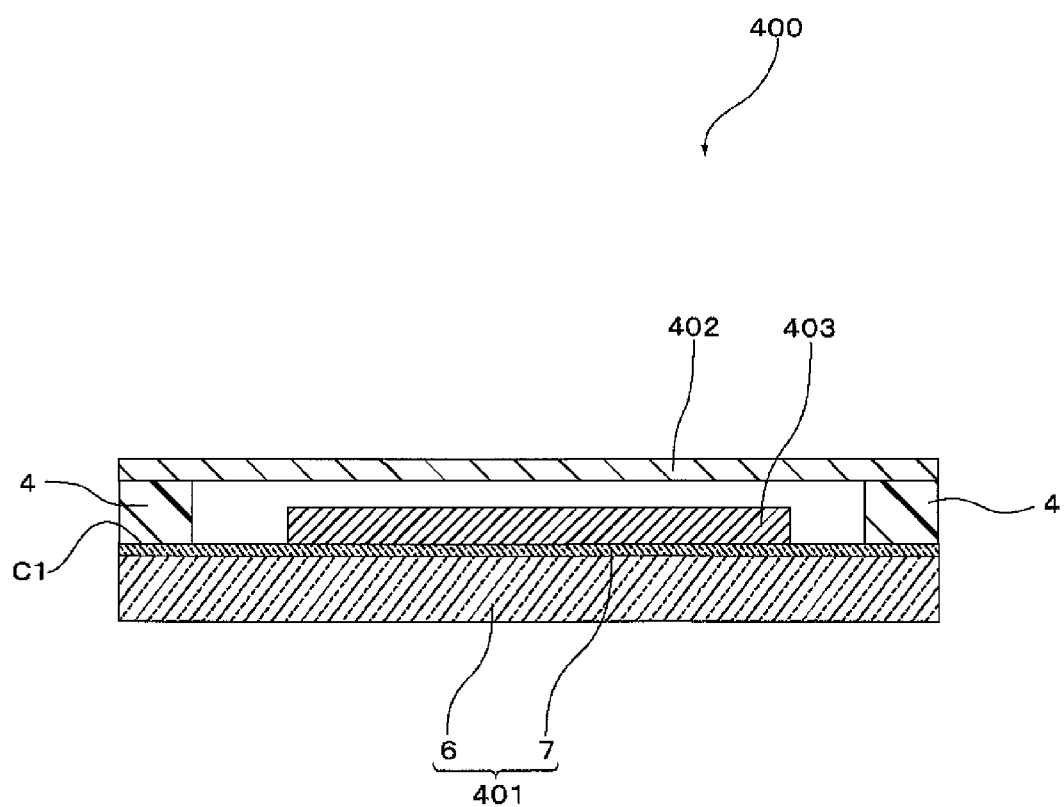
FIG. 12 is a cross-sectional view showing an electronic device obtained according to a fourth embodiment of the electronic device production method relating to the present invention.

Next, an explanation is provided of a fourth embodiment of the electronic device production method relating to the present invention with reference to FIG. 12.

FIG. 12 is a cross-sectional view showing an electronic device obtained according to the fourth embodiment of the electronic device production method relating to the present invention.

The present embodiment differs from the first to third embodiments in that the electronic device produced is an EL display apparatus. Namely, as shown in FIG. 12, the present embodiment differs from the first to third embodiments in that a first base material of an EL display apparatus 400 serving as an electronic device is a positive electrode 401 instead of the working electrode 1, a second base material is a sealing cap 402 instead of the counter electrode 2, and the sealed portion is an EL element portion 403 instead of the electrolyte layer 3. Here, the EL display apparatus 400 employs a sealed structure in which the EL element portion 403 is the sealed portion.

In addition, the positive electrode 401 is provided with a transparent substrate 6 and a transparent conductive film 7 provided thereon, and the EL element portion 403 is provided with a light emitting portion (not shown) and a negative electrode (not shown) provided on the light emitting portion on the opposite side from the positive electrode 401. Here, the light emitting portion may be composed of an inorganic material or organic material.

A plastic substrate or glass substrate having a high water vapor barrier property, for example, is used for the sealing cap 402.

As was previously described, the EL display apparatus 400 used in the present embodiment uses a positive electrode 401 obtained by forming the transparent conductive film 7 on the transparent substrate 6, and when producing the EL display apparatus 400, the sealing portion 4 is formed by using the above-mentioned sealing laminated sheet F or sealing laminated sheet F3. In this case, by fixing the sealing portion 4 to the surface of the positive electrode 401 using the sealing laminated sheet F or sealing laminated sheet F3, together with the sealing portion 4 being able to be efficiently fixed to the surface of the positive electrode 401, sealing performance of the sealing portion 4 can be adequately improved, and the EL display apparatus 400 can be stably produced in which decreases in light emission efficiency over time are adequately inhibited. Accordingly, according to this production method of the EL display apparatus 400, production efficiency of the EL display apparatus 400 can be improved while also adequately improving production yield.

In this manner, in the production method of the EL display apparatus 400, the sealing portion 4 is strongly fixed to the annular site C1 of the positive electrode 401. Thus, infiltration of air from the outside is adequately inhibited in the resulting EL display apparatus 400. Accordingly, this also is able to contribute to improved production yield of the EL display apparatus 400.

Fifth Embodiment

Figure 13:
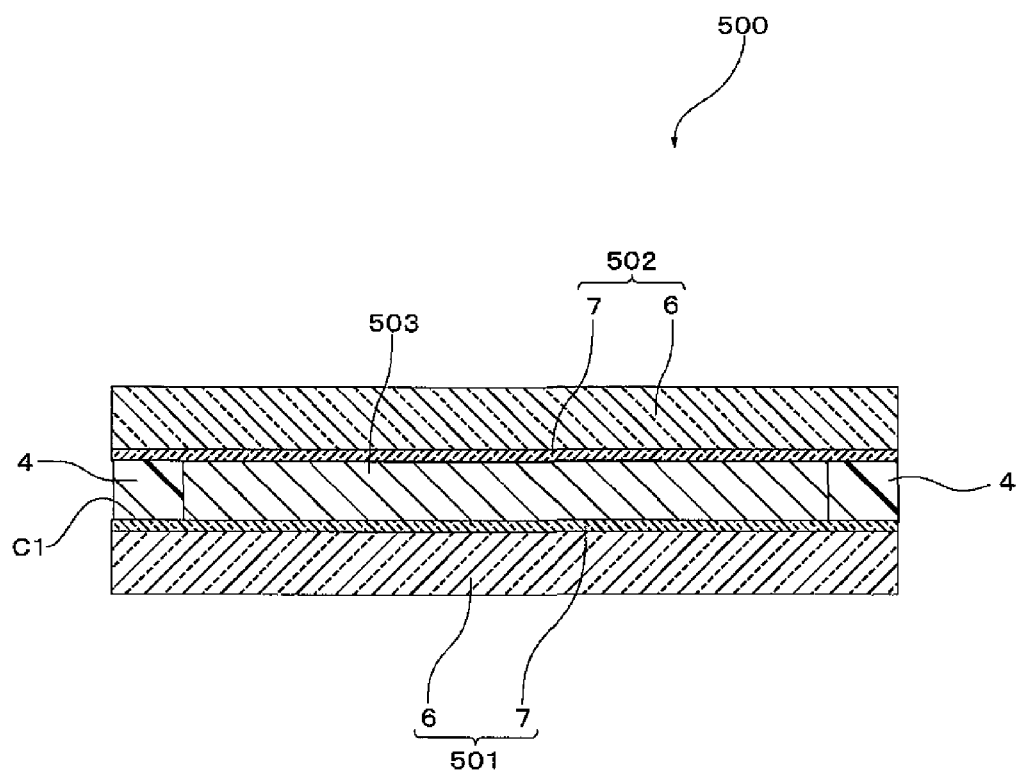
FIG. 13 is a cross-sectional view showing an electronic device obtained according to a fifth embodiment of the electronic device production method relating to the present invention.

Next, an explanation is provided of a fifth embodiment of the electronic device production method relating to the present invention with reference to FIG. 13.

FIG. 13 is a cross-sectional view showing an electronic device obtained according to the fifth embodiment of the electronic device production method relating to the present invention.

The present embodiment differs from the first to third embodiments in that the electronic device produced is a liquid crystal display apparatus. Namely, the present embodiment differs from the first to third embodiments in that a first base material of a liquid crystal display apparatus 500 serving as an electronic device is a first electrode 501 instead of the working electrode 1, a second base material is a second electrode 502 instead of the counter electrode 2, and the sealed portion is a liquid crystal layer 503 composed of liquid crystal instead of the electrolyte layer 3. Here, the liquid crystal display apparatus 500 employs a sealed structure in which the liquid crystal layer 503 is the sealed portion.

In addition, the first electrode 501 and the second electrode 502 are both provided with a transparent substrate 6 and a transparent conductive film 7 provided thereon.

As was previously described, the liquid crystal display apparatus 500 used in the present embodiment uses a first electrode 501 obtained by forming the transparent conductive film 7 on the transparent substrate 6, and when producing the liquid crystal display apparatus 500, the sealing portion 4 is formed by using the above-mentioned sealing laminated sheet F or sealing laminated sheet F3. In this case, by fixing the sealing portion 4 to the surface of the first electrode 501 using the sealing laminated sheet F or sealing laminated sheet F3, together with the sealing portion 4 being able to be efficiently fixed to the surface of the first electrode 501, sealing performance of the sealing portion 4 can be adequately improved, and the liquid crystal display apparatus 500 can be stably produced in which decreases in display characteristics over time are adequately inhibited. Accordingly, according to this production method of the liquid crystal display apparatus 500, production efficiency of the liquid crystal display apparatus 500 can be improved while also adequately improving production yield.

In addition, in the production method of the liquid crystal display apparatus 500, the sealing portion 4 is fixed prior to forming the liquid crystal layer 503. Consequently, when fixing the sealing portion 4 to the annular site C1 of the electrode 501, volatile components in the liquid crystal substance do not adhere to the annular site C1, and wettability of the surface thereof does not decrease. Thus, a thermoplastic resin is strongly adhered to the annular site C1, and the sealing portion 4 is strongly fixed to the annular site C1.

In this manner, in the production method of the liquid crystal display apparatus 500, the sealing portion 4 is strongly fixed to the annular site C1 of the first electrode 501. Thus, infiltration of air from the outside and leakage attributable to volatilization of liquid crystal substances are adequately inhibited in the resulting liquid crystal display apparatus 500. Accordingly, this also is able to contribute to improved production yield of the liquid crystal display apparatus 500.

Sixth Embodiment

Figure 14:
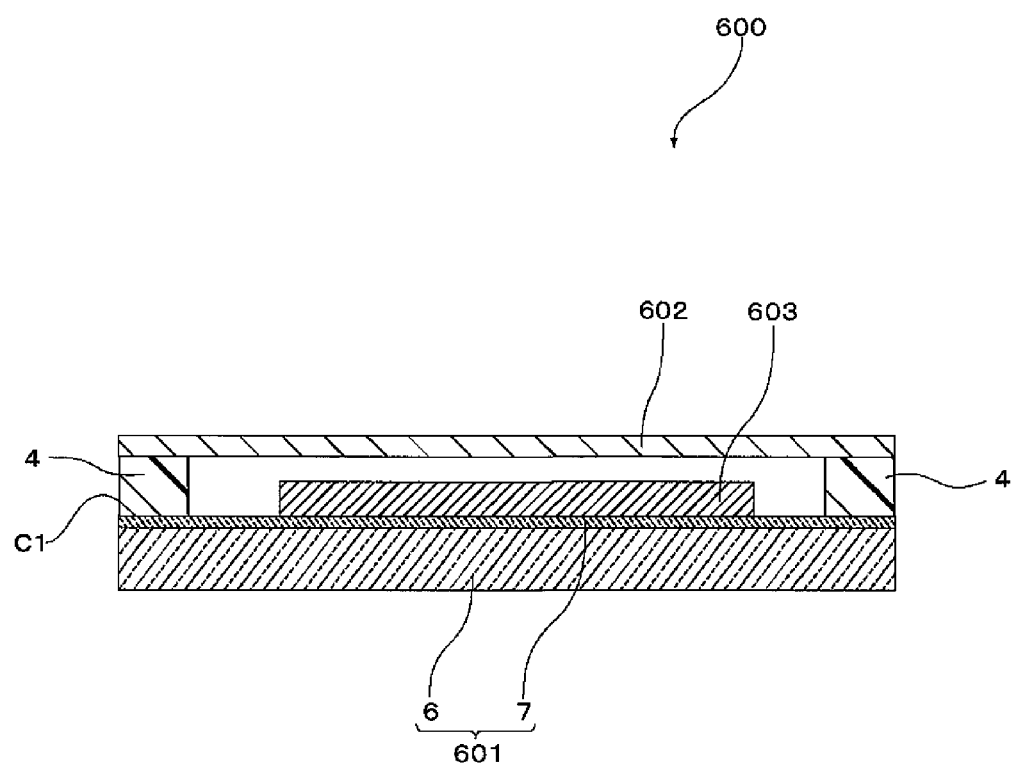
FIG. 14 is a cross-sectional view showing an electronic device obtained according to a sixth embodiment of the electronic device production method relating to the present invention.

Next, an explanation is provided of a sixth embodiment of the electronic device production method relating to the present invention with reference to FIG. 14.

FIG. 14 is a cross-sectional view showing an electronic device obtained according to the sixth embodiment of the electronic device production method relating to the present invention.

The present embodiment differs from the first to third embodiments in that the electronic device produced is an organic thin film solar cell. Namely, as shown in FIG. 14, the present embodiment differs from the first to third embodiments in that a first base material of an organic thin film solar cell 600 serving as an electronic device is a positive electrode 601 instead of the working electrode 1, a second base material is a sealing cap 602 instead of the counter electrode 2, and the sealed portion is a photoelectric conversion portion 603 composed of an organic thin film instead of the electrolyte layer 3. Here, the organic thin film solar cell 600 employs a sealed structure in which the photoelectric conversion portion 603 composed of an organic thin film is the sealed portion.

In addition, the positive electrode 601 is provided with a transparent substrate 6 and a transparent conductive film 7 provided thereon, and the photoelectric conversion portion 603 is provided with an organic thin film. A sealing cap similar to the sealing cap 402 of the fourth embodiment can be used for the sealing cap 602.

As was previously described, the organic thin film solar cell 600 used in the present embodiment uses a positive electrode 601 obtained by forming the transparent conductive film 7 on the transparent substrate 6, and when producing the organic thin film solar cell 600, the sealing portion 4 is formed by using the above-mentioned sealing laminated sheet F or sealing laminated sheet F3. In this case, by fixing the sealing portion 4 to the surface of the positive electrode 601 using the sealing laminated sheet F or sealing laminated sheet F3, together with the sealing portion 4 being able to be efficiently fixed to the surface of the positive electrode 601, sealing performance of the sealing portion 4 can be adequately improved, and the organic thin film solar cell 600 can be stably produced in which decreases in photoelectric conversion efficiency over time are adequately inhibited. Accordingly, according to this production method of the organic thin film solar cell 600, production efficiency of the organic thin film solar cell 600 can be improved while also adequately improving production yield.

In this manner, in the production method of the organic thin film solar cell 600, the sealing portion 4 is strongly fixed to the annular site C1 of the positive electrode 601. Thus, infiltration of air from the outside is adequately inhibited in the resulting organic thin film solar cell 600. Accordingly, this also is able to contribute to improvement of production yield of the organic thin film solar cell 600.

The present invention is not limited to the previously described first to sixth embodiments. For example, although an annular sealing portion 4 in which only the first sheet 4A is processed was used in the first to sixth embodiments, the second sheet 5 in addition to the first sheet 4A may be processed to have an annular shape. In this case as well, since not only does extraction of the metal mold blade naturally become easier, but separation of unnecessary portions of the first sheet 4A from the second sheet 5 is not required, thereby further facilitating processing work to the sealing laminated sheet F. Furthermore, in this case, although the resulting processed laminated sheet F1 has an annular shape overall, in this case as well, since the annular sealing portion 4 is reinforced by the second sheet 5, it retains its own shape.

Moreover, although the sealing portion 4 is fixed only to the first base material in the previously described first to sixth embodiments, the sealing portion 4 may also be fixed to the second base material in addition to the first base material. In this case, sealing of the sealed portion can be carried out by mutually adhering sealing portion 4 fixed to the first base material and the sealing portion 4 fixed to the second base material. In this case as well, sealing of the sealed portion is carried out with the first base material, the second base material and the sealing portion 4.

Figure 15:
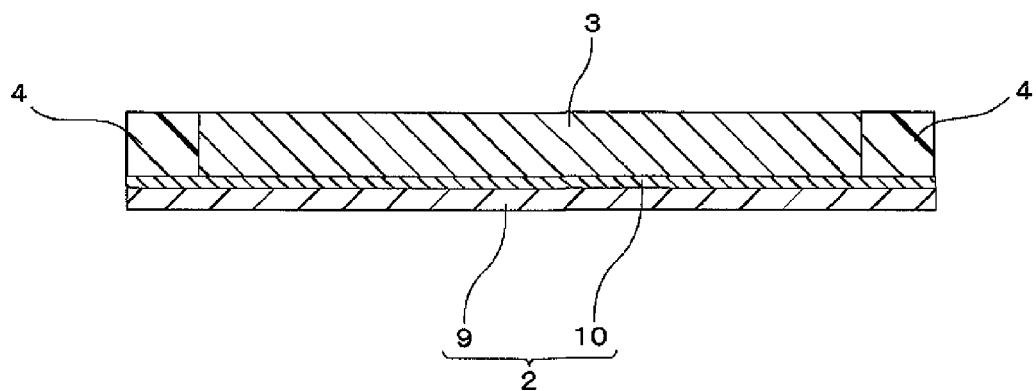
FIG. 15 is a cross-sectional view showing one step of another embodiment of the electronic device production method relating to the present invention.

In addition, although the sealing portion 4 is only fixed to the working electrode 1 in the previously described first to third embodiments, as shown in FIG. 15, the sealing portion 4 may also be fixed to the counter electrode 2. In this case, the electrolyte layer 3 is formed to the inside of the sealing portion 4. Here, in the case the counter electrode base material 9 that composes the counter electrode 2 is composed of a material capable of forming a passive state such as titanium, the catalyst layer 10 is preferably composed of a metal catalyst such as Pt and the sealing portion 4 is preferably fixed on the catalyst layer 10. In this case, although the surface of the counter electrode base material 9 is oxidized to a metal oxide and the sealing portion 4 can be strongly adhered, since the wettability on the surface of the catalyst layer 10 is better than the wettability on the surface of the counter electrode base material 9, the sealing portion 4 can be more strongly adhered to the counter electrode 2. Furthermore, in the case the catalyst layer 10 is composed of a non-metal catalyst such as carbon or an electrically conductive polymer, since the wettability of the surface of the counter electrode base material 9 becomes better than the wettability on the surface of the catalyst layer 10, the sealing portion 4 is preferably directly fixed to the surface of the counter electrode base material 9. In order to accomplish this, the catalyst layer 10 is formed only, for example, to the inside of the annular site where the sealing portion 4 is scheduled to be fixed.

In addition, although the first base material has the transparent substrate 6 and the transparent conductive film 7, and the sealing portion 4 is fixed on the transparent conductive film 7 in the previously described first to sixth embodiments, in the case the transparent substrate 6 is composed of glass, the transparent conductive film 7 may only be formed to the inside of the annular site C1 where the sealing portion 4 is scheduled to be fixed, and the sealing portion 4 may be formed directly on the transparent substrate 6. In this case as well, the sealing portion 4 adheres even more easily due to hydrogen bonding with the glass. In addition, in the case the transparent substrate 6 is composed of a PET film or PEN film that is comparatively resistant to adhesion with an acid-modified polyolefin-based thermoplastic resin, for example, the sealing portion 4 is fixed on the transparent conductive film 7 as in the previously described first to sixth embodiments.

Figure 16:
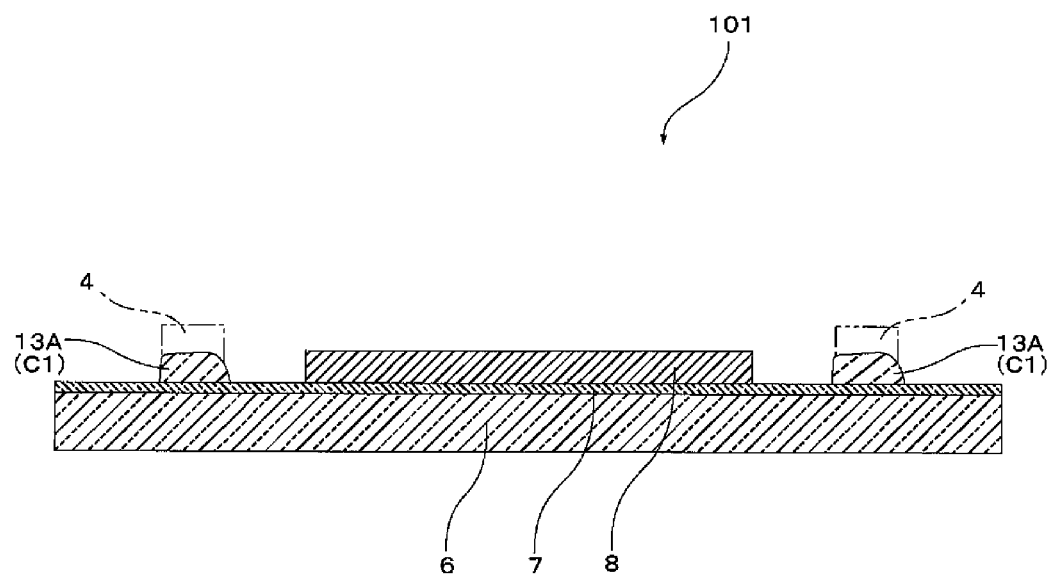
FIG. 16 is a cross-sectional view showing one step of still another embodiment of the electronic device production method relating to the present invention.

In addition, in the previously described first to third embodiments, a working electrode 101, which additionally has a protrusion 13A composed of an inorganic material so as to protrude from the transparent conductive film 7 as shown in FIG. 16, may be used instead of the working electrode 1. This protrusion 13A is a site where the sealing portion 4 is formed and serves as the annular site C1.

In this case, since the protrusion 13A composed of an inorganic material is provided so as to protrude from the transparent conductive film 7, it demonstrates the function of sealing the electrolyte layer 3 together with the sealing portion 4. Moreover, since the protrusion 13A is composed of an inorganic material, it has greater sealing ability than the sealing portion 4 composed of a thermoplastic resin. Consequently, leakage of electrolyte can be more adequately inhibited than in the case of the working electrode 1 not having the protrusion 13A.

Figure 17:
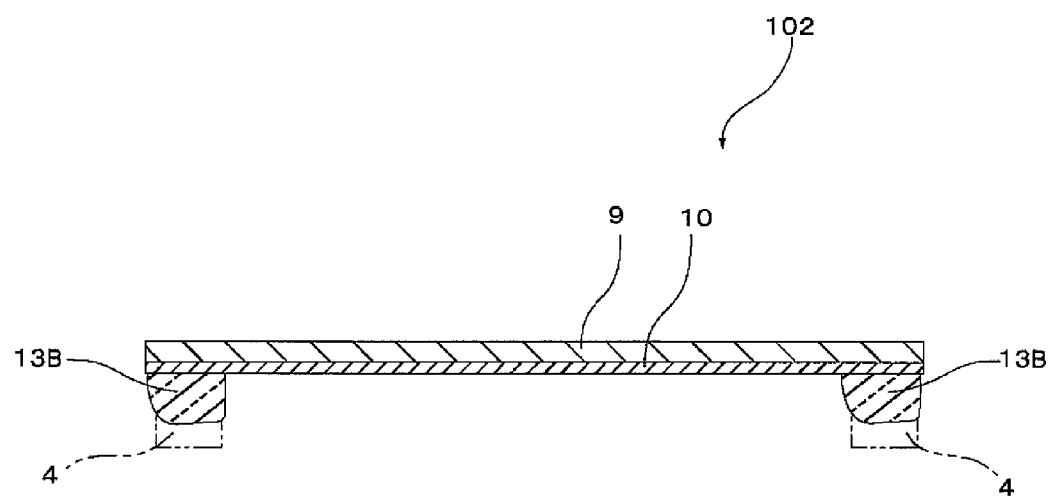
FIG. 17 is a cross-sectional view showing one step of still another embodiment of the electronic device production method relating to the present invention.

In addition, a counter electrode 102, which additionally has a protrusion 13B composed of an inorganic material so as to protrude from the catalyst layer 10, can also be used in the previously described embodiments as shown in FIG. 17. This protrusion 13B is a site where the sealing portion 4 is formed.

In this case, since the protrusion 13B composed of an inorganic material is provided so as to protrude from the catalyst layer 10, it demonstrates the function of sealing the electrolyte layer 3 together with the sealing portion 4. Moreover, since the protrusion 13B is composed of an inorganic material, it has greater sealing ability than the sealing portion 4 composed of a thermoplastic resin. Consequently, leakage of electrolyte can be more adequately inhibited than in the case of the counter electrode 2 not having the protrusion 13B.

Examples of materials that can be used for the inorganic materials that compose the protrusions 13A and 13B include inorganic insulating materials such as non-lead-based transparent, low melting glass frit and metal materials such as silver. In particular, a wiring portion typically formed on the working electrode 1 is preferably also used as the protrusion 13A. Here, the wiring portion is composed of a metal wiring formed with a metal material such as silver, and a wiring protective layer composed of an inorganic insulating material such as low melting glass frit that covers the metal wiring.

Moreover, although examples of electronic devices that apply the sealing laminated sheet of the present invention include a dye-sensitized solar cell, EL display apparatus, liquid crystal display apparatus and organic thin film solar cell in the previously described first to sixth embodiments, electronic devices that apply the sealing laminated sheet of the present invention are not limited to the above electronic devices, but rather the electronic device may also be, for example, a secondary battery or scintillator panel.

Although the following provides a more specific explanation of the contents of the present invention by listing examples thereof, the present invention is not limited to the following examples. Furthermore, the temperatures of rollers A and B in the following Tables 1 to 4 are indicated in the manner of "roller A temperature/roller B temperature". Namely, the value to the left of the "/" indicates the temperature of roller A, while the value to the right of the "/" indicates the temperature of roller B.

Example 1

First, an FTO substrate measuring 10 cm×10 cm×4 mm was prepared. Continuing, a titanium oxide paste (Ti Nanoxide T/sp, manufactured by Solaronix) was coated onto the FTO substrate to a thickness of 10 μm using a doctor blade method, followed by baking for 3 hours at 150° C. to form a porous oxide semiconductor layer on the FTO substrate and obtain a working electrode measuring 5 cm×5 cm.

Next, this working electrode was immersed for one day and one night in an absolute ethanol solution in which N719 photosensitive dye was dissolved to a concentration of 0.2 mM to load the photosensitive dye on the working electrode.

On the other hand, an FTO substrate similar to the FTO substrate used for the working electrode was prepared, and this was used as a counter electrode substrate. A platinum catalyst layer having a thickness of 10 nm was formed on this counter electrode substrate by sputtering to obtain a counter electrode.

The working electrode and the counter electrode were prepared in the manner described above.

Next, a sealing laminated sheet was prepared in the following manner. Namely, a first sheet composed of an ionomer in the form of Himilan (trade name, manufactured by Dupont-Mitsui Polychemicals, melting point: 98° C.) and having a thickness of 30 μm was first prepared.

On the other hand, a second sheet composed of a polybutylene terephthalate (PBT) in the form of Novaduran (trade name, manufactured by Mitsubishi Engineering-Plastics, melting point: 224° C.) and having a thickness of 75 μm was prepared.

These sheets were then laminated using a laminator to obtain a sealing laminated sheet. More specifically, the sealing laminated sheet was obtained in the manner described below.

Namely, two PTFE sheets having a thickness of 100 μm were first prepared in addition to the first sheet and the second sheet. This group of sheets was then superimposed in the order of the PTFE sheet, second sheet, first sheet and PTFE sheet. This group of sheets was then passed through four sets of two rollers A and B, and the group of sheets was laminated by pressing and heating with each of the sets of rollers A and B. Subsequently, the two PTFE sheets were separated to obtain a sealing laminated sheet. At this time, the temperatures of each set of the rollers A and B was set to 100° C. for both rollers as shown in Table 1, and the pressure was set to 3 MPa for both rollers.

The first sheet of the sealing laminated sheet obtained in the manner described above was then processed using a cutting plotter (FC2250, manufactured by Graphtec) to obtain a sealing portion in the shape of a quadrangular ring having a width of 1 mm. At this time, the depth and pressing force of the blade used to cut the first sheet were adjusted so that the second sheet was not completely severed.

Next, the processed laminated sheet obtained in the manner described above was positioned in opposition to the working electrode so that the sealing portion contacted the annular site that surrounds the porous oxide semiconductor layer of the working electrode.

At this time, the working electrode was housed in a pressure reduction vessel having an opening and arranged so that the porous oxide semiconductor layer faced the opening. Continuing, the opening of the depressurized space was covered with the second sheet to form a sealed space, and that sealed space was depressurized to 500 hPa with a vacuum pump.

The sealing portion was then adhered to the annular site by heating and melting at 200° C. for 5 minutes through the second sheet, followed by separating the second sheet from the sealing portion. The sealing portion was fixed to the annular site on the FTO substrate in this manner.

Next, the working electrode having the sealing portion fixed thereon was arranged so that the surface of the FTO substrate on the side of the porous oxide semiconductor layer was level, and an electrolyte layer was formed to the inside of the sealing portion by injecting a volatile electrolyte that used a volatile solvent composed of methoxyacetonitrile for the primary solvent and contained lithium iodide at 0.1 M, iodine at 0.05 M and 4-tert-butylpyridine at 0.5 M.

Next, after injecting the electrolyte layer into the working electrode having the sealing portion fixed thereon, the working electrode was housed in a pressure reduction vessel. Subsequently, the sealed space inside the pressure reduction vessel was depressurized to 500 hPa with a vacuum pump. The sealing portion and the counter electrode were then laminated in this reduced pressure environment. At this time, the platinum catalyst layer of the counter electrode was made to contact the sealing portion.

A brass metal frame of the same size as the sealing portion was heated, and the metal frame was locally heated and melted at 200° C. while applying pressure of 3 MPa to adhere the sealing portion to the counter electrode. The structure obtained in this manner was then taken out of the pressure reduction vessel and placed in an environment at atmospheric pressure. A dye-sensitized solar cell was obtained in this manner.

Example 2

A dye-sensitized solar cell was produced in the same manner as Example 1 with the exception of changing the thermoplastic resin that composes the first sheet from the Himilan ionomer to an ethylene-methacrylic acid copolymer in the form of Nucrel1 (trade name, manufactured by Dupont-Mitsui Polychemicals, melting point: 98° C.), and setting the temperature of the rollers A and B and the peel strength at 25° C. of the second sheet relative to the first sheet (to simply be referred to as "peel strength") as shown in Table 1.

Example 3

A dye-sensitized solar cell was produced in the same manner as Example 1 with the exception of changing the thermoplastic resin that composes the first sheet from the Himilan ionomer to a maleic anhydride-modified polyethylene in the form of Bynel (trade name, manufactured by Dupont K. K., melting point: 127° C.), and setting the temperature of the rollers A and B and the peel strength as shown in Table 1.

Example 4

A dye-sensitized solar cell was produced in the same manner as Example 1 with the exception of changing the thermoplastic resin that composes the first sheet from the Himilan ionomer to a modified polyethylene in the form of 05L04 (trade name, manufactured by Tosoh, melting point: 108° C.), and setting the temperature of the rollers A and B and the peel strength as shown in Table 1.

Example 5

A dye-sensitized solar cell was produced in the same manner as Example 1 with the exception of changing the thermoplastic resin that composes the second sheet from PBT to polyethylene terephthalate (PET), and setting the temperature of the rollers A and B and the peel strength as shown in Table 1.

Example 6

A dye-sensitized solar cell was produced in the same manner as Example 2 with the exception of changing the thermoplastic resin that composes the second sheet from PBT to PET, and setting the temperature of the rollers A and B and the peel strength as shown in Table 1.

Example 7

A dye-sensitized solar cell was produced in the same manner as Example 3 with the exception of changing the thermoplastic resin that composes the second sheet from PBT to PET, and setting the temperature of the rollers A and B and the peel strength as shown in Table 1.

Example 8

A dye-sensitized solar cell was produced in the same manner as Example 4 with the exception of changing the thermoplastic resin that composes the second sheet from PBT to PET, and setting the temperature of the rollers A and B and the peel strength as shown in Table 1.

Example 9

A dye-sensitized solar cell was produced in the same manner as Example 1 with the exception of changing the thermoplastic resin that composes the second sheet from PBT to Nylon 6, and setting the temperature of the rollers A and B and the peel strength as shown in Table 1.

Example 10

A dye-sensitized solar cell was produced in the same manner as Example 2 with the exception of changing the thermoplastic resin that composes the second sheet from PBT to Nylon 6, and setting the temperature of the rollers A and B and the peel strength as shown in Table 1.

Example 11

A dye-sensitized solar cell was produced in the same manner as Example 3 with the exception of changing the thermoplastic resin that composes the second sheet from PBT to Nylon 6, and setting the temperature of the rollers A and B and the peel strength as shown in Table 1.

Example 12

A dye-sensitized solar cell was produced in the same manner as Example 4 with the exception of changing the thermoplastic resin that composes the second sheet from PBT to Nylon 6, and setting the temperature of the rollers A and B and the peel strength as shown in Table 1.

Example 13

A dye-sensitized solar cell was produced in the same manner as Example 1 with the exception of changing the thermoplastic resin that composes the second sheet from PBT to polyethylene naphthalate (PEN), and setting the temperature of the rollers A and B and the peel strength as shown in Table 1.

Example 14

A dye-sensitized solar cell was produced in the same manner as Example 2 with the exception of changing the thermoplastic resin that composes the second sheet from PBT to PEN, and setting the temperature of the rollers A and B and the peel strength as shown in Table 1.

Example 15

A dye-sensitized solar cell was produced in the same manner as Example 3 with the exception of changing the thermoplastic resin that composes the second sheet from PBT to PEN, and setting the temperature of the rollers A and B and the peel strength as shown in Table 1.

Example 16

A dye-sensitized solar cell was produced in the same manner as Example 4 with the exception of changing the thermoplastic resin that composes the second sheet from PBT to PEN, and setting the temperature of the rollers A and B and the peel strength as shown in Table 1.

Example 17

A dye-sensitized solar cell was produced in the same manner as Example 1 with the exception of setting the temperature of the rollers A and B and the peel strength as shown in Table 1.

Example 18

A dye-sensitized solar cell was produced in the same manner as Example 2 with the exception of setting the temperature of the rollers A and B and the peel strength as shown in Table 1.

Example 19

A dye-sensitized solar cell was produced in the same manner as Example 3 with the exception of setting the temperature of the rollers A and B and the peel strength as shown in Table 1.

Example 20

A dye-sensitized solar cell was produced in the same manner as Example 4 with the exception of setting the temperature of the rollers A and B and the peel strength as shown in Table 1.

Comparative Example 1

A dye-sensitized solar cell was produced in the same manner as Example 1 with the exception of arranging only a sealing portion in the shape of a quadrangular ring obtained by processing the first sheet of Table 2 on the surface of the working electrode instead of the sealing laminated sheet, and fixing the sealing portion to the surface of the working electrode by heating and melting the sealing portion through the cover film shown in Table 2 when adhering the sealing portion to the surface of the working electrode.

Namely, a first sheet having a thickness of 30 μm and composed of an ionomer in the form of Himilan was first prepared in the same manner as Example 1.

The first sheet was then processed using a cutting plotter (FC2250, manufactured by Graphtec) in the same manner as previously described to obtain a sealing portion in the shape of a quadrangular ring having a width of 1 mm.

Next, the sealing portion in the shape of a quadrangular ring obtained in this manner was positioned in opposition to the working electrode so that the sealing portion contacted the annular site that surrounds the porous oxide semiconductor layer of the working electrode.

This working electrode was then housed in a pressure reduction vessel having an opening and arranged so that the porous oxide semiconductor layer faced the opening.

At this time, a cover film composed of a polybutylene terephthalate in the form of Novaduran (trade name, manufactured by Mitsubishi Engineering-Plastics, melting point: 224° C.) and having a thickness of 75 μm was prepared, the opening of the depressurized space was covered with this cover film to form a sealed space, and that sealed space was depressurized to 500 hPa with a vacuum pump.

The sealing portion was then adhered to the annular site by heating and melting at 200° C. for 5 minutes through the cover film, followed by separating the second sheet from the sealing portion. The sealing portion was fixed to the annular site on the PTO substrate in this manner.

Comparative Examples 2 to 4

Dye-sensitized solar cells were produced in the same manner as Examples 2 to 4 with the exception of arranging only a sealing portion in the shape of a quadrangular ring obtained by processing the first sheet of Table 2 on the surface of the working electrode instead of the sealing laminated sheet, and fixing the sealing portion to the surface of the working electrode by heating and melting the sealing portion through the cover film shown in Table 2 when adhering the sealing portion to the surface of the working electrode.

Comparative Example 5

A dye-sensitized solar cell was produced in the same manner as Example 1 with the exception of changing the thermoplastic resin that composes the second sheet from PBT to PET, and setting the temperature of the rollers A and B and the peel strength as shown in Table 2.

Comparative Example 6

A dye-sensitized solar cell was produced in the same manner as Example 3 with the exception of changing the thermoplastic resin that composes the second sheet from PBT to PET, and setting the temperature of the rollers A and B and the peel strength as shown in Table 2.

Comparative Example 7

A dye-sensitized solar cell was produced in the same manner as Example 1 with the exception of setting the temperature of the rollers A and B and the peel strength as shown in Table 2.

Comparative Example 8

A dye-sensitized solar cell was produced in the same manner as Example 3 with the exception of setting the temperature of the rollers A and B and the peel strength as shown in Table 2.

Example 21

First, an FTO substrate measuring 10 cm×10 cm×4 mm was prepared. Continuing, a titanium oxide paste (Ti Nanoxide T/sp, manufactured by Solaronix) was coated onto the FTO substrate to a thickness of 10 μm using a doctor blade method, followed by baking for 3 hours at 150° C. to form a porous oxide semiconductor layer on the FTO substrate and obtain a working electrode measuring 5 cm×5 cm.

Next, this working electrode was immersed for one day and one night in an absolute ethanol solution in which N719 photosensitive dye was dissolved to a concentration of 0.2 mM to load the photosensitive dye on the working electrode.

On the other hand, an FTO substrate similar to the FTO substrate used for the working electrode was prepared, and this was used as a counter electrode substrate. A platinum catalyst layer having a thickness of 10 nm was formed on this counter electrode substrate by sputtering to obtain a counter electrode.

The working electrode and the counter electrode were prepared in the manner described above.

Next, a sealing laminated sheet was prepared in the following manner. Namely, a first layer forming sheet composed of an ionomer in the form of Himilan and having a thickness of 30 μm was first prepared. In addition, a second layer forming sheet composed of an ethylene-methacrylic acid copolymer in the form of Nucrel and having a thickness of 30 μm was prepared.

On the other hand, a second sheet composed of a polybutylene terephthalate (PET) in the form of Novaduran and having a thickness of 75 μm was prepared.

These sheets were then laminated using a laminator to obtain a sealing laminated sheet. More specifically, the sealing laminated sheet was obtained in the manner described below.

Namely, two PTFE sheets having a thickness of 100 μm were first prepared in addition to the first layer forming sheet, the second layer forming sheet and the second sheet. This group of sheets was then superimposed in the order of the PTFE sheet, second sheet, second layer forming sheet, first layer forming sheet and PTFE sheet. This group of sheets was then passed through four sets of two rollers A and B, and the group of sheets was laminated by pressing and heating with each of the sets of rollers A and B. Subsequently, the two PTFE sheets were separated to obtain a sealing laminated sheet. At this time, the temperatures of each set of the rollers A and B was set to 100° C. for both rollers as shown in Table 3, and the pressure was set to 3 MPa for both rollers.

A sealing laminated sheet was obtained in the manner described above. This sealing laminated sheet was formed of a laminate of the first sheet and the second sheet, and the first sheet was composed of the second layer and the first layer in that order from the side of the second sheet. The first sheet of this sealing laminated sheet was then processed using a cutting plotter (FC2250, manufactured by Graphtec) to obtain a sealing portion in the shape of a quadrangular ring having a width of 1 mm. At this time, the depth and pressing force of the blade used for cutting were adjusted so that the second sheet was not completely severed.

Next, the processed laminated sheet obtained in the manner described above was positioned in opposition to the working electrode so that the sealing portion contacted the annular site that surrounds the porous oxide semiconductor layer of the working electrode.

At this time, the working electrode was housed in a pressure reduction vessel having an opening and arranged so that the porous oxide semiconductor layer faced the opening. Continuing, the opening of the depressurized space was covered with the second sheet to form a sealed space, and that sealed space was depressurized to 500 hPa with a vacuum pump.

The sealing portion was then adhered to the annular site by heating and melting at 200° C. for 5 minutes through the second sheet, followed by separating the second sheet from the sealing portion. The sealing portion was fixed to the annular site on the FTO substrate in this manner.

Next, the working electrode having the sealing portion fixed thereon was arranged so that the surface of the FTO substrate on the side of the porous oxide semiconductor layer was level, and an electrolyte layer was formed to the inside of the sealing portion by injecting a volatile electrolyte that used a volatile solvent composed of methoxyacetonitrile for the primary solvent and contained lithium iodide at 0.1 M, iodine at 0.05 M and 4-tert-butylpyridine at 0.5 M.

Next, after injecting the electrolyte layer into the working electrode having the sealing portion fixed thereon, the working electrode was housed in a pressure reduction vessel. Subsequently, the sealed space inside the pressure reduction vessel was depressurized to 500 hPa with a vacuum pump. The sealing portion and the counter electrode were then laminated in this reduced pressure environment. At this time, the platinum catalyst layer of the counter electrode was made to contact the sealing portion.

A brass metal frame of the same size as the sealing portion was heated, and the metal frame was locally heated and melted at 200° C. while applying pressure of 3 MPa to adhere the sealing portion to the counter electrode. The structure obtained in this manner was then taken out of the pressure reduction vessel and placed in an environment at atmospheric pressure. A dye-sensitized solar cell was obtained in this manner.

Example 22

A dye-sensitized solar cell was produced in the same manner as Example 21 with the exception of changing the first layer forming sheet from the Himilan ionomer to an ethylene-methacrylic acid copolymer in the form of Nucrel, changing the second layer forming sheet from the ethylene-methacrylic acid copolymer in the form of Nucrel to the Himilan ionomer, and setting the temperature of the rollers A and B and peel strength as shown in Table 3.

Example 23

A dye-sensitized solar cell was produced in the same manner as Example 21 with the exception of changing the first layer forming sheet from the Himilan ionomer to a maleic anhydride-modified polyethylene in the form of Bynel, and setting the temperature of the rollers A and B and peel strength as shown in Table 3.

Example 24

A dye-sensitized solar cell was produced in the same manner as Example 21 with the exception of changing the first layer forming sheet from the Himilan ionomer to a modified polyethylene in the form of 05L04, changing the second layer forming sheet from the ethylene-methacrylic acid copolymer in the form of Nucrel to the Himilan ionomer, and setting the temperature of the rollers A and B and peel strength as shown in Table 3.

Example 25

A dye-sensitized solar cell was produced in the same manner as Example 21 with the exception of changing the thermoplastic resin that composes the second sheet from PBT to PET, and setting the temperature of the rollers A and B and peel strength as shown in Table 3.

Example 26

A dye-sensitized solar cell was produced in the same manner as Example 22 with the exception of changing the second layer forming sheet from the Himilan ionomer to a maleic anhydride-modified polyethylene in the form of Bynel, changing the thermoplastic resin that composes the second sheet from PBT to PET, and setting the temperature of the rollers A and B and peel strength as shown in Table 3.

Example 27

A dye-sensitized solar cell was produced in the same manner as Example 23 with the exception of changing the thermoplastic resin that composes the second sheet from PBT to PET, and setting the temperature of the rollers A and B and peel strength as shown in Table 3.

Example 28

A dye-sensitized solar cell was produced in the same manner as Example 24 with the exception of changing the thermoplastic resin that composes the second sheet from PBT to PET, and setting the temperature of the rollers A and B and peel strength as shown in Table 3.

Example 29

A dye-sensitized solar cell was produced in the same manner as Example 21 with the exception of changing the width from 1 mm to 5 mm when processing the first sheet of the sealing laminated sheet into a sealing portion in the shape of a quadrangular ring using a cutting plotter.

Example 30

A dye-sensitized solar cell was produced in the same manner as Example 22 with the exception of changing the width from 1 mm to 5 mm when processing the first sheet of the sealing laminated sheet into a sealing portion in the shape of a quadrangular ring using a cutting plotter.

Example 31

A dye-sensitized solar cell was produced in the same manner as Example 23 with the exception of changing the width from 1 mm to 5 mm when processing the first sheet of the sealing laminated sheet into a sealing portion in the shape of a quadrangular ring using a cutting plotter.

Example 32

A dye-sensitized solar cell was produced in the same manner as Example 24 with the exception of changing the width from 1 mm to 5 mm when processing the first sheet of the sealing laminated sheet into a sealing portion in the shape of a quadrangular ring using a cutting plotter.

Example 33

A dye-sensitized solar cell was produced in the same manner as Example 25 with the exception of changing the width from 1 mm to 5 mm when processing the first sheet of the sealing laminated sheet into a sealing portion in the shape of a quadrangular ring using a cutting plotter.

Example 34

A dye-sensitized solar cell was produced in the same manner as Example 26 with the exception of changing the width from 1 mm to 5 mm when processing the first sheet of the sealing laminated sheet into a sealing portion in the shape of a quadrangular ring using a cutting plotter.

Example 35

A dye-sensitized solar cell was produced in the same manner as Example 27 with the exception of changing the width from 1 mm to 5 mm when processing the first sheet of the sealing laminated sheet into a sealing portion in the shape of a quadrangular ring using a cutting plotter.

Example 36

A dye-sensitized solar cell was produced in the same manner as Example 28 with the exception of changing the width from 1 mm to 5 mm when processing the first sheet of the sealing laminated sheet into a sealing portion in the shape of a quadrangular ring using a cutting plotter.

Example 37

A dye-sensitized solar cell was produced in the same manner as Example 21 with the exception of setting the temperature of the rollers A and B and peel strength as shown in Table 3.

Example 38

A dye-sensitized solar cell was produced in the same manner as Example 23 with the exception of setting the temperature of the rollers A and B and peel strength as shown in Table 3.

Example 39

A dye-sensitized solar cell was produced in the same manner as Example 25 with the exception of setting the temperature of the rollers A and B and peel strength as shown in Table 3.

Example 40

A dye-sensitized solar cell was produced in the same manner as Example 23 with the exception of changing the thermoplastic resin that composes the second sheet from PBT to PET, and setting the temperature of the rollers A and B and peel strength as shown in Table 3.

Example 41

A dye-sensitized solar cell was produced in the same manner as Example 21 with the exception of changing the thermoplastic resin that composes the second sheet from PBT to a methylpentene polymer in the form of TPX (TPX, manufactured by Mitsui Chemicals), and setting the temperature of the rollers A and B and peel strength as shown in Table 3.

Example 42

A dye-sensitized solar cell was produced in the same manner as Example 21 with the exception of changing the thermoplastic resin that composes the second sheet from PBT to a polypropylene in the form of PP (Prime Polypro, manufactured by Prime Polymer), and setting the temperature of the rollers A and B and peel strength as shown in Table 3.

Comparative Example 9

A dye-sensitized solar cell was produced in the same manner as Example 21 with the exception of respectively processing a first layer forming sheet and second layer forming sheet of Table 4 into the shape of a quadrangular ring having a thickness of 1 mm and sequentially laminating and arranging on the surface of a working electrode as a sealing portion instead of the sealing laminated sheet, and fixing the sealing portion to the surface of the working electrode by heating and melting through a cover film shown in Table 4 when adhering the sealing portion to the surface of the working electrode.

Namely, a first layer forming sheet composed of an ionomer in the form of Himilan and having a thickness of 30 μm was prepared in the same manner as Example 21. In addition, a second layer forming sheet composed of an ethylene-methacrylic acid copolymer in the form of Nucrel and having a thickness of 30 μm was prepared.

The first layer forming sheet was then processed into the shape of a quadrangular ring having a width of 1 mm using a cutting plotter (FC2250, manufactured by Graphtec) in the same manner as previously described. Similarly, the second layer forming sheet was processed into the shape of a quadrangular ring having a width of 1 mm using a cutting plotter.

Next, the first layer forming sheet and the second layer forming sheet in the shape of a quadrangular ring obtained in this manner were sequentially laminated and arranged at the annular site that surrounds the porous oxide semiconductor layer of the working electrode.

This working electrode was then housed in a pressure reduction vessel having an opening and arranged so that the porous oxide semiconductor layer faced the opening.

At this time, a cover film composed of a polybutylene terephthalate in the form of Novaduran and having a thickness of 75 μM was prepared, the opening of the depressurized space was covered with this cover film to form a sealed space, and that sealed space was depressurized to 500 hPa with a vacuum pump.

The sealing portion was then adhered to the annular site by heating and melting at 200° C. for 5 minutes through the cover film, followed by separating the cover film from the sealing portion. The sealing portion was fixed to the annular site on the FTC substrate in this manner.

Comparative Example 10

A dye-sensitized solar cell was produced in the same manner as Comparative Example 9 with the exception of changing the first layer forming sheet from the Himilan ionomer to an ethylene-methacrylic acid copolymer in the form of Nucrel and changing the second layer forming sheet from the ethylene-methacrylic acid copolymer in the form of Nucrel to the Himilan ionomer.

Comparative Example 11

A dye-sensitized solar cell was produced in the same manner as Comparative Example 9 with the exception of changing the first layer forming sheet from the Himilan ionomer to a maleic anhydride-modified polyethylene in the form of Bynel.

Comparative Example 12

A dye-sensitized solar cell was produced in the same manner as Comparative Example 10 with the exception of changing the first layer forming sheet from the ethylene-methacrylic acid copolymer in the form of Nucrel to a modified polyethylene in the form of 05L04.

Comparative Example 13

A dye-sensitized solar cell was produced in the same manner as Comparative Example 9 with the exception of changing the thermoplastic resin that composes the cover film from PBT to PET.

Comparative Example 14

A dye-sensitized solar cell was produced in the same manner as Comparative Example 10 with the exception of changing the thermoplastic resin that composes the cover film from PBT to PET.

Comparative Example 15

A dye-sensitized solar cell was produced in the same manner as Comparative Example 11 with the exception of changing the thermoplastic resin that composes the cover film from PBT to PET.

Comparative Example 16

A dye-sensitized solar cell was produced in the same manner as Comparative Example 12 with the exception of changing the thermoplastic resin that composes the cover film from PBT to PET.

Comparative Example 17

A dye-sensitized solar cell was produced in the same manner as Comparative Example 9 with the exception of changing the width from 1 mm to 5 mm when processing the first layer forming sheet and the second layer forming sheet into a sealing portion in the shape of a quadrangular ring using a cutting plotter.

Comparative Example 18

A dye-sensitized solar cell was produced in the same manner as Comparative Example 13 with the exception of changing the width from 1 mm to 5 mm when processing the first layer forming sheet and the second layer forming sheet into a sealing portion in the shape of a quadrangular ring using a cutting plotter.

Comparative Example 19

A dye-sensitized solar cell was produced in the same manner as Comparative Example 14 with the exception of changing the width from 1 mm to 5 mm when processing the first layer forming sheet and the second layer forming sheet into a sealing portion in the shape of a quadrangular ring using a cutting plotter.

Comparative Example 20

A dye-sensitized solar cell was produced in the same manner as Comparative Example 15 with the exception of changing the width from 1 mm to 5 mm when processing the first layer forming sheet and the second layer forming sheet into a sealing portion in the shape of a quadrangular ring using a cutting plotter.

Comparative Example 21

A dye-sensitized solar cell was produced in the same manner as Example 21 with the exception of changing the thermoplastic resin that composes the second sheet from PBT to PP (Prime Polypro, manufactured by Prime Polymer), and setting the temperature of the rollers A and B and peel strength as shown in Table 4.

Comparative Example 22

A dye-sensitized solar cell was produced in the same manner as Example 23 with the exception of changing the thermoplastic resin that composes the second sheet from PBT to PP (Prime Polypro, manufactured by Prime Polymer), and setting the temperature of the rollers A and B and peel strength as shown in Table 4.

Comparative Example 23

A dye-sensitized solar cell was produced in the same manner as Example 21 with the exception of changing the thermoplastic resin that composes the second sheet from PBT to PP (Prime Polypro, manufactured by Prime Polymer), and setting the temperature of the rollers A and B and peel strength as shown in Table 4.

Comparative Example 24

A dye-sensitized solar cell was produced in the same manner as Example 23 with the exception of changing the thermoplastic resin that composes the second sheet from PBT to PP (Prime Polypro, manufactured by Prime Polymer), and setting the temperature of the rollers A and B and peel strength as shown in Table 4.

[Evaluation of Properties]

Ten each of the dye-sensitized solar cells obtained in Examples 1 to 42 and Comparative Examples 1 to 24 were produced and allowed to stand undisturbed for 1000 hours under conditions of 85° C. and 85% RH followed by measurement of a rate of decrease in photoelectric conversion efficiency. At this time, a dye-sensitized solar cell that demonstrated a rate of decrease in photoelectric conversion efficiency of more than 50% was judged to be acceptable, that which demonstrated a rate of decrease in photoelectric conversion efficiency of 50% or less was judged to be unacceptable, and the percentage of acceptable solar cells was calculated by measuring the number of acceptable solar cells. The results are shown in Tables 1 to 4.

In addition, warping of the sealing laminated sheets of Examples 21 to 42 and Comparative Examples 9 to 14 was also evaluated. Warping was evaluated in the manner indicated below corresponding to the distance between the flat surface of the sealing laminated sheet when naturally allowed to stand undisturbed on a level surface and the corners of the sealing laminated sheet when the surface of each sealing laminated sheet was processed into the shape of a square measuring 200 mm×200 mm. The results are shown in Tables 3 and 4. Here, the distance between the flat surface and the corners of each sealing laminated sheet refers to the distance between the flat surface and the corner among the four corners of the sealing laminated sheet for which the distance between that corner and the flat surface is the greatest.

A: Less than 10 mm
B: 10 mm to less than 30 mm
C: 30 mm or more

As shown in Tables 1 to 4, in contrast to the percentage of acceptable solar cells for the dye-sensitized solar cells of Examples 1 to 42 being 70 to 100%, the percentage of acceptable solar cells for the dye-sensitized solar cells of Comparative Examples 1 to 24 was 0 to 60%.

In the case of the dye-sensitized solar cells of Examples 1 to 42, processing work of the first sheet with a cutter was facilitated by the use of the sealing laminated sheet, and the sealing laminated sheet was able to be easily arranged on the surface of the working electrode 1 while still retaining its own shape, thereby making it possible to adequately improve production efficiency.

On the basis thereof, the sealing laminated sheet of the present invention and the electronic device production method using that sealing laminated sheet were confirmed to enable electronic device production efficiency and electronic device production yield to be improved.

TABLE 1

| | First Sheet | First Sheet Melting Point (° C.) | Second Sheet | Second Sheet Melting Point (° C.) | Rollers A and B Temp. (° C./° C.) | Peel Strength at 25° C. (N/15 mm) | Cover Film | Percentage of Acceptable Solar Cells (%) |
|---|---|---|---|---|---|---|---|---|
| Ex. 1 | Himilan | 98 | PBT | 224 | 100/100 | 1.2 | — | 95 |
| Ex. 2 | Nucrel | 98 | PBT | 224 | 100/100 | 2.4 | — | 95 |
| Ex. 3 | Bynel | 127 | PBT | 224 | 140/140 | 3.6 | — | 100 |
| Ex. 4 | 05L04 | 108 | PBT | 224 | 110/110 | 1.2 | — | 90 |
| Ex. 5 | Himilan | 98 | PET | 260 | 100/100 | 1.3 | — | 85 |
| Ex. 6 | Nucrel | 98 | PET | 260 | 100/100 | 2.5 | — | 80 |
| Ex. 7 | Bynel | 127 | PET | 260 | 140/140 | 3.6 | — | 85 |
| Ex. 8 | 05L04 | 108 | PET | 260 | 110/110 | 1.4 | — | 75 |
| Ex. 9 | Himilan | 98 | Nylon6 | 225 | 100/100 | 2.5 | — | 80 |
| Ex. 10 | Nucrel | 98 | Nylon6 | 225 | 100/100 | 4.6 | — | 80 |

TABLE 1-continued

| | First Sheet | First Sheet Melting Point (° C.) | Second Sheet | Second Sheet Melting Point (° C.) | Rollers A and B Temp. (° C./° C.) | Peel Strength at 25° C. (N/15 mm) | Cover Film | Percentage of Acceptable Solar Cells (%) |
|---|---|---|---|---|---|---|---|---|
| Ex. 11 | Bynel | 127 | Nylon6 | 225 | 140/140 | 4.8 | — | 80 |
| Ex. 12 | 05L04 | 108 | Nylon6 | 225 | 110/110 | 4.2 | — | 75 |
| Ex. 13 | Himilan | 98 | PEN | 270 | 100/100 | 2.5 | — | 90 |
| Ex. 14 | Nucrel | 98 | PEN | 270 | 100/100 | 3.2 | — | 90 |
| Ex. 15 | Bynel | 127 | PEN | 270 | 140/140 | 4.3 | — | 95 |
| Ex. 16 | 05L04 | 108 | PEN | 270 | 110/110 | 2.1 | — | 85 |
| Ex. 17 | Himilan | 98 | PBT | 224 | 200/200 | 7.2 | — | 80 |
| Ex. 18 | Nucrel | 98 | PBT | 224 | 200/200 | 8.9 | — | 75 |
| Ex. 19 | Bynel | 127 | PBT | 224 | 200/200 | 9.8 | — | 85 |
| Ex. 20 | 05L04 | 108 | PBT | 224 | 200/200 | 6.4 | — | 70 |

TABLE 2

| | First Sheet | First Sheet Melting Point (° C.) | Second Sheet | Second Sheet Melting Point (° C.) | Rollers A and B Temp. (° C./° C.) | Peel Strength at 25° C. (N/15 mm) | Cover Film | Percentage of Acceptable Solar Cells (%) |
|---|---|---|---|---|---|---|---|---|
| Comp. Ex. 1 | Himilan | 98 | — | — | — | — | PBT | 20 |
| Comp. Ex. 2 | Nucrel | 98 | — | — | — | — | PBT | 30 |
| Comp. Ex. 3 | Bynel | 127 | — | — | — | — | PBT | 20 |
| Comp. Ex. 4 | 05L04 | 108 | — | — | — | — | PBT | 15 |
| Comp. Ex. 5 | Himilan | 98 | PET | 260 | 300/300 | 15 | — | 15 |
| Comp. Ex. 6 | Bynel | 127 | PET | 260 | 300/300 | 16 | — | 25 |
| Comp. Ex. 7 | Himilan | 98 | PBT | 224 | 250/250 | 12 | — | 45 |
| Comp. Ex. 8 | Bynel | 127 | PBT | 224 | 250/250 | 14 | — | 50 |

TABLE 3

| | First Sheet | | | | | | | | | |
|---|---|---|---|---|---|---|---|---|---|---|
| | First Layer | First Layer Melting Point (° C.) | Second Layer | Second Layer Melting Point (° C.) | Second Sheet | Second Sheet Melting Point (° C.) | Roller A and B Temp. (° C./° C.) | Peel Strength at 25° C. (N/15 mm) | Cover Film | Percentage of Acceptable Solar Cells (%) | Warping |
| Ex. 21 | Himilan | 98 | Nucrel | 98 | PBT | 224 | 100/100 | 2.3 | — | 95 | A |
| Ex. 22 | Nucrel | 98 | Himilan | 98 | PBT | 224 | 100/100 | 2.8 | — | 95 | A |
| Ex. 23 | Bynel | 127 | Nucrel | 98 | PBT | 224 | 140/120 | 3.1 | — | 95 | A |
| Ex. 24 | 05L04 | 108 | Himilan | 98 | PBT | 224 | 120/100 | 2.8 | — | 90 | B |
| Ex. 25 | Himilan | 98 | Nucrel | 98 | PET | 260 | 100/100 | 2.6 | — | 95 | A |
| Ex. 26 | Nucrel | 98 | Bynel | 127 | PET | 260 | 140/120 | 5.2 | — | 95 | A |
| Ex. 27 | Bynel | 127 | Nucrel | 98 | PET | 260 | 140/120 | 3.6 | — | 95 | B |
| Ex. 28 | 05L04 | 108 | Himilan | 98 | PET | 260 | 120/100 | 3.2 | — | 90 | B |
| Ex. 29 | Himilan | 98 | Nucrel | 98 | PBT | 224 | 100/100 | 2.3 | — | 100 | A |
| Ex. 30 | Nucrel | 98 | Himilan | 98 | PBT | 224 | 100/100 | 2.8 | — | 100 | A |
| Ex. 31 | Bynel | 127 | Nucrel | 98 | PBT | 224 | 140/120 | 3.1 | — | 100 | A |
| Ex. 32 | 05L04 | 108 | Himilan | 98 | PBT | 224 | 120/100 | 2.8 | — | 95 | B |
| Ex. 33 | Himilan | 98 | Nucrel | 98 | PET | 260 | 100/100 | 2.6 | — | 100 | A |
| Ex. 34 | Nucrel | 98 | Bynel | 127 | PET | 260 | 140/120 | 5.2 | — | 100 | A |
| Ex. 35 | Bynel | 127 | Nucrel | 98 | PET | 260 | 140/120 | 3.6 | — | 100 | B |
| Ex. 36 | 05L04 | 108 | Himilan | 98 | PET | 260 | 120/100 | 3.2 | — | 95 | B |
| Ex. 37 | Himilan | 98 | Nucrel | 98 | PBT | 224 | 120/120 | 3.2 | — | 95 | A |
| Ex. 38 | Bynel | 127 | Nucrel | 98 | PBT | 224 | 160/140 | 4.3 | — | 95 | A |
| Ex. 39 | Himilan | 98 | Nucrel | 98 | PET | 260 | 120/120 | 3.1 | — | 95 | A |
| Ex. 40 | Bynel | 127 | Nucrel | 98 | PET | 260 | 160/140 | 4.3 | — | 95 | B |
| Ex. 41 | Himilan | 98 | Nucrel | 98 | TPX | 233 | 100/100 | 2.3 | — | 80 | B |
| Ex. 42 | Himilan | 98 | Nucrel | 98 | PP | 162 | 100/100 | 6.4 | — | 80 | C |

TABLE 4

| | First Sheet | | | | | | | | | |
|---|---|---|---|---|---|---|---|---|---|---|
| | First Layer | First Layer Melting Point (° C.) | Second Layer | Second Layer Melting Point (° C.) | Second Sheet | Second Sheet Melting Point (° C.) | Roller A and B Temp. (° C./° C.) | Peel Strength at 25° C. (N/15 mm) | Cover Film | Percentage of Acceptable Solar Cells (%) | Warping |
| Comp. Ex. 9 | Himilan | 98 | Nucrel | 98 | — | — | — | — | PBT | 20 | A |
| Comp. Ex. 10 | Nucrel | 98 | Himilan | 98 | — | — | — | — | PBT | 30 | A |
| Comp. Ex. 11 | Bynel | 127 | Nucrel | 98 | — | — | — | — | PBT | 20 | A |
| Comp. Ex. 12 | 05L04 | 108 | Himilan | 98 | — | — | — | — | PBT | 10 | B |
| Comp. Ex. 13 | Himilan | 98 | Nucrel | 98 | — | — | — | — | PET | 30 | A |
| Comp. Ex. 14 | Nucrel | 98 | Himilan | 98 | — | — | — | — | PET | 40 | A |
| Comp. Ex. 15 | Bynel | 127 | Nucrel | 98 | — | — | — | — | PET | 30 | B |
| Comp. Ex. 16 | 05L04 | 108 | Himilan | 98 | — | — | — | — | PET | 20 | B |
| Comp. Ex. 17 | Himilan | 98 | Nucrel | 98 | — | — | — | — | PBT | 60 | A |
| Comp. Ex. 18 | Himilan | 98 | Nucrel | 98 | — | — | — | — | PET | 60 | A |
| Comp. Ex. 19 | Nucrel | 98 | Himilan | 98 | — | — | — | — | PET | 50 | A |
| Comp. Ex. 20 | Bynel | 127 | Nucrel | 98 | — | — | — | — | PET | 60 | B |
| Comp. Ex. 21 | Himilan | 98 | Nucrel | 98 | PP | 162 | 140/140 | 12 or more | — | 0 | C |
| Comp. Ex. 22 | Bynel | 127 | Nucrel | 98 | PP | 162 | 140/140 | 13 or more (including severed sample) | — | 0 | C |
| Comp. Ex. 23 | Himilan | 98 | Nucrel | 98 | PP | 162 | 160/160 | 18 or more (including severed sample) | — | 0 | C |
| Comp. Ex. 24 | Bynel | 127 | Nucrel | 98 | PP | 162 | 160/160 | 19 or more (including severed sample) | — | 0 | C |

EXPLANATION OF REFERENCE NUMERALS

1,101: working electrode (first base material, first electrode), 2,102: counter electrode (second base material, second electrode), 3: electrolyte (sealed portion), 4A: first sheet, 4A1: first layer, 4A2: second layer, 4: sealing portion, 5: second sheet, 13A,13B: protrusion, 100,400,500,600: dye-sensitized solar cell (electronic device), 400: EL display apparatus (electronic device), 401: positive electrode (first base material), 402: sealing cap (second base material), 403: EL element portion (sealed portion), 500: liquid crystal display apparatus (electronic device), 501: first electrode (first base material), 502: second electrode (second base material), 503: liquid crystal layer (sealed portion), 600: organic thin film solar cell (electronic device), 601: positive electrode (first base material), 602: sealing cap (second base material), 603: photoelectric conversion portion (sealed portion), C1: annular site, F, F3: sealing laminated sheet, F1: processed laminated sheet

The invention claimed is:

1. A sealing laminated sheet for an electronic device, in which a first sheet and a second sheet are laminated,
    wherein the first sheet contains an acid-modified polyolefin-based thermoplastic resin,
    the second sheet has a melting point higher than that of the first sheet, and
    a peel strength at 25° C. of the second sheet relative to the first sheet is 0.5 to 10.0 N/15 mm.

2. The sealing laminated sheet for an electronic device according to claim 1, wherein the second sheet has bending strength greater than that of the first sheet.

3. The sealing laminated sheet for an electronic device according to claim 1, wherein the acid-modified polyolefin-based thermoplastic resin contained in the first sheet is an acid-modified polyethylene-based thermoplastic resin.

4. The sealing laminated sheet for an electronic device according to claim 3, wherein the acid-modified polyethylene-based thermoplastic resin is an ionomer, ethylene-methacrylic acid copolymer or maleic anhydride-modified polyethylene.

5. The sealing laminated sheet for an electronic device according to claim 1, wherein the second sheet contains at least one type of polyester-based resin and polyamide-based resin.

6. The sealing laminated sheet for an electronic device according to claim 1, wherein the second sheet contains polybutylene terephthalate or polyethylene naphthalate.

7. The sealing laminated sheet for an electronic device according to claim 1, wherein the first sheet is formed of a laminate having a plurality of layers containing the acid-modified polyolefin-based thermoplastic resin.

8. The sealing laminated sheet for an electronic device according to claim 7, wherein the first sheet is formed of a laminate having a layer containing ethylene-methacrylic acid copolymer and a layer containing an ionomer or maleic anhydride-modified polyethylene.

9. The sealing laminated sheet for an electronic device according to claim 1, wherein the electronic device includes:
    a first base material;
    a second base material opposing the first base material;
    a sealed portion provided between the first base material and the second base material; and
    a sealing portion that seals the sealed portion by connecting the first base material and the second base material.

10. The sealing laminated sheet for an electronic device according to claim 1, wherein the electronic device is a dye-sensitized solar cell.

11. The sealing laminated sheet for an electronic device according to claim 1, wherein the electronic device is an organic thin film solar cell, a liquid crystal display apparatus or an EL display apparatus.

12. An electronic device production method comprising:
a preparation step of preparing a first base material and a second base material;
a sealing portion fixing step of fixing an annular sealing portion on at least one of the first base material and the second base material, using the sealing laminated sheet for an electronic device according to claim 1;
a sealed portion formation step of forming a sealed portion on the inside of the sealing portion; and
a sealing step of sealing the sealed portion with the sealing portion, the first base material and the second base material,
wherein the sealing portion fixing step includes:
a step of obtaining a processed laminated sheet by processing the first sheet of the sealing laminated sheet for an electronic device to obtain an annular sealing portion;
a step of arranging the processed laminated sheet on at least one of the first base material and the second base material so that the annular sealing portion contacts the base material;
a step of heating and melting the annular sealing portion through the second sheet; and
a step of separating the second sheet from the sealing portion.

13. The electronic device production method according to claim 12, wherein the first base material is a first electrode having a porous oxide semiconductor layer,
the second base material is a second electrode,
the sealed portion is an electrolyte layer comprising an electrolyte,
the electronic device is a dye-sensitized solar cell, and a dye loading step of loading a photosensitive dye onto the porous oxide semiconductor layer is provided between the sealing portion fixing step and the sealed portion forming step, and
the sealed portion formation step is an electrolyte layer formation step of forming the electrolyte layer by arranging the electrolyte on the inside of the sealing portion.

* * * * *